United States Patent
Hoyland

(10) Patent No.: US 10,607,239 B2
(45) Date of Patent: Mar. 31, 2020

(54) ENTERPRISE EVALUATION USING STRUCTURED DATA

(71) Applicant: Christine A. Hoyland, Norfolk, VA (US)

(72) Inventor: Christine A. Hoyland, Norfolk, VA (US)

(73) Assignee: Customer 1 Focus, LLC, Norfolk, VA (US)

( * ) Notice: Subject to any disclaimer, the term of this patent is extended or adjusted under 35 U.S.C. 154(b) by 1146 days.

(21) Appl. No.: 14/720,773

(22) Filed: May 23, 2015

(65) Prior Publication Data

US 2015/0339681 A1 Nov. 26, 2015

Related U.S. Application Data

(60) Provisional application No. 62/002,201, filed on May 23, 2014.

(51) Int. Cl.
*G06Q 30/02* (2012.01)
*G06Q 10/06* (2012.01)

(52) U.S. Cl.
CPC ......... *G06Q 30/0201* (2013.01); *G06Q 10/06* (2013.01); *G06Q 10/0637* (2013.01); *G06Q 30/02* (2013.01)

(58) Field of Classification Search
CPC ........... G06Q 10/0639; G06Q 30/0201; G06Q 10/0637
See application file for complete search history.

(56) References Cited

U.S. PATENT DOCUMENTS

| 7,162,427 | B1 | 1/2007 | Myrick et al. | |
|---|---|---|---|---|
| 2009/0089126 | A1* | 4/2009 | Odubiyi | G06F 17/271 705/7.39 |
| 2009/0292930 | A1* | 11/2009 | Marano | G06F 21/6218 713/189 |
| 2010/0114628 | A1* | 5/2010 | Adler | G06Q 10/063 705/7.11 |

(Continued)

OTHER PUBLICATIONS

Hoyland, et al. "The RQ-Tech methodology: a new paradigm for conceptualizing strategic enterprise architectures," Journal of Management Analytics, vol. 1, No. 1, May 1, 2014, pp. 55-77.

(Continued)

*Primary Examiner* — Andre D Boyce
(74) *Attorney, Agent, or Firm* — LaBatt, LLC

(57) ABSTRACT

A solution for evaluating an enterprise is provided. The solution can include constructing an enterprise governance library from a set of enterprise governance documents. Each enterprise governance document can include natural language text defining at least a portion of the enterprise. The enterprise governance library can be constructed by parsing the natural language text to identify a set of references relating to the enterprise and creating structured data based on the set of references. Each reference can identify a key object relating to the enterprise, such as an organization of the enterprise, an agent of the enterprise, a product of the enterprise, or a product used by the enterprise. The structured data for each key object can include attributes of the key object, data associating the key object with the enterprise governance document, and data for enabling access to data corresponding to the reference.

20 Claims, 21 Drawing Sheets

(56) References Cited

U.S. PATENT DOCUMENTS

2010/0318558 A1   12/2010   Boothroyd
2011/0307401 A1   12/2011   Altman
2012/0179696 A1    7/2012   Charlot et al.
2017/0060856 A1*   3/2017   Turtle .................... G06F 17/30

OTHER PUBLICATIONS

Hoyland, Christine A., "RQ-Tech, A Strategic-Level Approach for Conceptualizing Enterprise Architectures," SciVerse Science Direct, Procedia Computer Science, 2012, pp. 37-42.

Hoyland, Christine A., Dissertation submitted and presented in Aug. 2013 to the Faculty of Old Dominion University, titled "The RQ-Tech Methodology: A New Paradigm for Conceptualizing Strategic Enterprise Architectures."

* cited by examiner

FIG. 1
Prior Art

| ENTERPRISE ARCHITECTURE – Framework (based on Zachman) | | | | | | |
|---|---|---|---|---|---|---|
| Level/ (Owner) | DATA (What) | FUNCTION (How) | NETWORK (Where) | PEOPLE (Who) | TIME (When) | MOTIVATION (Why) |
| ENTERPRISE Scope (Planner) | Natural Language, Maps, Graphics (What the Enterprise "Should-Be") | | | | | Documented Mission Vision, Goals, Objectives, Rules, Regs, Laws |
| ENTERPRISE Dept (Owner) | Semantic Model | Business Process Model | Logical Network | Work Flow Model | Events, Master Schedule | Business Plan |
| SYSTEM (Designer) | Logical Data Model | Application Model | Distributed System Architecture | Human-Interface Architecture | Processing Structure | Business Rule Model |
| TECHNOLOGY (Builder) | Physical Data Model | System Design | System Architecture | Presentation Architecture | Control Structure | Rule Design |
| DETAILED REPRESENTATIONS (Sub-Contractor) | Data Definition | Program | Network Architecture | Security Architecture | Timing Definition | Rule Specification |
| FUNCTIONING ENTERPRISE | e.g. Data | e.g. Function | e.g. Network | e.g. Organization | e.g. Schedule | e.g. Strategy |

FIG. 6A

ORG CARD — 52A

Organization Identity

54A →

Name: Operations Department
Nickname: OPS
Swimlane: Production
Generic?: No
Homepage: www.OPS.com

54C

Organization Depiction

Organization Locations

| | | |
|---|---|---|
| | | |

Organization Membership

| Agent Members | Team Members |
|---|---|
| | |
| | |
| | |

Organization Products

| Title | Created by | Key Words | xRefs |
|---|---|---|---|
| 54B | | | |
| | | | |
| | | | |

Organizational Communications

| Received From | Message | Keywords | Sent To |
|---|---|---|---|
| | | | |
| | | | |
| | | | |

FIG. 6C

DOC CARD

Document Identity

| | |
|---|---|
| Title: | Marketing Plan |
| Short Title: | (none listed) |
| Doc Type: | Document |
| Doc Source: | BPSU1.0 Ver 2011 |
| Generic?: | Yes |
| Doc .pdf: | http:123.pdf |

58C

Document Template

Document Keywords

| 58B | | |
|---|---|---|
| | | |

Document Details

| Author/swimlane: | | |
|---|---|---|
| Publisher/Pub Date: | | |
| Description: | | |

(Document Name) Reference Chart –
As Required by (Governance Document Name)

Other Documents That Reference the Reference Documents

| | | | | |
|---|---|---|---|---|
| • Last Bullet<br>• xRef Name<br>• xRef Name<br>• xRef Name<br>• xRef Name<br>• xRef Name<br>• First xRef Name | • Last Bullet<br>• xRef Name<br>• xRef Name<br>• xRef Name<br>• First xRef Name | • Last Bullet<br>• xRef Name<br>• xRef Name<br>• xRef Name<br>• xRef Name<br>• First xRef Name | •Last Bullet<br>• xRef Name<br>• First xRef Name | |

Other Documents That Refer to (Document Name) (pg 1 of x)

| xRef Name 1 | xRef Name 2 | xRef Name 3 | xRef Name 4 | xRef Name 5 |
|---|---|---|---|---|

60A → (Document Name)

(Document Name) Keywords (pg 1 of x)

| keyword 1 | keyword 2 | keyword 3 | keyword 4 | keyword 5 |
|---|---|---|---|---|

Documents Directly Linked to (Document Name)

| Document Name | Doc Type | Description | Creator | Creator's Swimlane |
|---|---|---|---|---|
| (Document Name 1) | xRef | First line of description....... | Org/Agent | Mgment |
| (Document Name 2) | Doc | First line of description....... | Org/Agent | Production |
| (Document Name 2) | ........ | ...... | ....... | ..... |

FIG. 6G

Work Project (name) ORG CARD — 52G

Organization Identity

Name: Operations Department
Nickname: OPS
Swimlane: Production
Generic?: No
Homepage: www.OPS.com

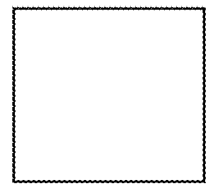
Organization Depiction

Organization Locations

| | | |
|---|---|---|
| | | |

Organization Membership

| Agent Members | Team Members |
|---|---|
| | |
| | |
| | |

Organization Products / Linked Systems

| Time Index | Title | Created by | Key Words | xRefs |
|---|---|---|---|---|
| | | | | |
| | | | | |
| | | | | |

Organizational Communications

| Time Index | Received From | Message | Keywords | Sent To |
|---|---|---|---|---|
| | | | | |
| | | | | |
| | | | | |

— 52H

Work Project (name) Message CARD

Message Subject:

XYZ Co. Marketing Plan is Ready for Review

Document Attachment(s)

Document Keywords

|  |  |  |
|---|---|---|
|  |  |  |

Document Details

| Time (t): |  | Author / swimlane: |  |
|---|---|---|---|

Message Content:

FIG. 6I
521
Work Project (name) DOC CARD
Document Identity
Title: XYZ Co. Marketing Plan
Short Title: (none listed)
Doc Type: Document
Doc Source: BPSU1.0 Ver 2011
Generic?: No
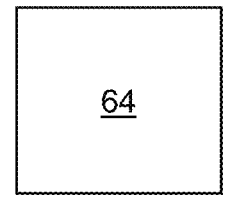
Document .pdf
Selected Document Keywords
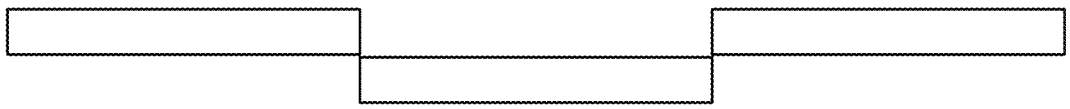
Work project Document Details
| Time (t) | Author/swimlane: | Publisher/Pub Date: |
|---|---|---|
|  |  |  |
| Description: |
|---|
|  |

ENTERPRISE EVALUATION USING STRUCTURED DATA

REFERENCE TO RELATED APPLICATIONS

The current application claims the benefit of U.S. Provisional Application No. 62/002,201, which was filed on 23 May 2014, and which is hereby incorporated by reference.

TECHNICAL FIELD

The disclosure relates generally to business enterprise knowledge management, and more particularly, to enterprise evaluation techniques.

BACKGROUND ART

Entrepreneurs are advised to develop a business plan written to communicate an objective, critical and unemotional view of how the business enterprise will function in order to achieve strategic goals. Business plan documentation contains details regarding not only the direct costs of producing the products or services, but indirect costs required to engineer, market, certify, service, and warehouse the enterprise. Projections regarding hiring and training costs for required personnel are estimated based on required interactions of personnel acting as specified by their position descriptions within the enterprise. All this information about the new enterprise is described in a brief, written document agreed to by the business partners. At this point, the newly formed enterprise architecture, as described in the resultant business plan, represents the whole enterprise. If the start-up is small and day-to-day decisions are made between a few partners working on new ideas, the business plan may be the first attempt at documenting the enterprise in text, charts and graphics. The process of writing the business plan may uncover regulations the partners had not yet considered, including how they propose to comply with industry standards, satisfy local and federal tax requirements, and manage the costs involved in attracting and maintaining customers, among others.

As an enterprise organization grows, the original, simple business plan outline no longer represents established and complex enterprise organizations as each major business function grows to a more complex structure. Changes to the mature enterprise are needed to reflect changes in industry laws and regulations as well as strategic decisions that reshape the future of the organization. Strategic managers of a complex enterprise may charter their staff or consultants to research and write changes to the organization. When accepted, management signifies their approval of departmental change documents in writing. It is this shared, documented and approved strategic perspective that now provides the current holistic view of the complex organization to personnel tasked with implementing change. Often the enterprise becomes so complex, even experienced workers have difficulty describing all the required details that take place between the various systems when they write system requirements for technology and may not understand or know about important cross-functional collaborations. Stove-piped technology solutions are the result of technology planning focused on the needs of a singular enterprise system and its department management structure. To ensure that strategic decisions are reasonable, the technology planning process and deliverable requirements need to be driven and guided by the holistic view of the business enterprise. Even though the unwritten culture of the organization is important, it is the written documentation that conveys the minimum critical specifications of the enterprise. Written documentation signifies what enterprise resources are necessary to carry out the required changes, including those of cross-functional departments, to produce its products and services. In some cases, these documented actions are not only authorized but mandated by law and may carry significant penalties if not followed as written.

SUMMARY OF THE INVENTION

The inventor recognizes that enterprise evaluation approaches, including modeling approaches, proposed to date include one or more limitations. These limitations include: failing to utilize/consider all applicable information (e.g., available documents); failure to present information, including documented information, in a manner that allows the user to quickly discern information and/or evaluate key information (which can include referenced information in other sections of the same document and/or other cross-referenced documents); failure to understand and properly address that the dynamic nature of a complex socio-technical enterprise requires personnel to make informed decisions based on collaboration with others in the enterprise; and/or the like.

Aspects of the invention provide a solution for visualizing and/or modeling an enterprise architecture. The model can include the strategic mission, vision, goals, objectives, policies, regulations, governance, and/or the like, which combine to define the nature of a complex system, such as for example, a systems enterprise composed of several integrated business systems and various information technology architectures. To this extent, aspects of the invention provide a solution for evaluating an enterprise. The solution can include constructing an enterprise governance library from a set of enterprise governance documents. Each enterprise governance document can include natural language text defining at least a portion of the enterprise. The enterprise governance library can be constructed by parsing the natural language text to identify a set of references relating to the enterprise and creating structured data based on the set of references. Each reference can identify a key object relating to the enterprise, such as an organization of the enterprise, an agent of the enterprise, a product of the enterprise, or a product used by the enterprise. The structured data for each key object can include attributes of the key object, data associating the key object with the enterprise governance document, and data for enabling access to data corresponding to the reference.

A first aspect of the invention provides a computerized method of evaluating an enterprise, the method comprising: constructing an enterprise governance library from a set of enterprise governance documents using a computer system, wherein each enterprise governance document in the set of enterprise governance documents includes natural language text defining at least a portion of the enterprise, and wherein the constructing includes: parsing the natural language text to identify a set of references relating to the enterprise, wherein each reference in the set of references identifies a key object relating to the enterprise, wherein the key object is one of: an organization of the enterprise, an agent of the enterprise, a product of the enterprise, or a product used by the enterprise; generating and storing structured data on the computer system for the enterprise governance document and for each key object in a set of key objects based on the set of references identified in the natural language text, wherein the structured data for each key object includes: a plurality of attributes of the key object; data associating the key object with the enterprise governance document; and data for enabling access to data corresponding to the reference.

A second aspect of the invention provides a computer system for evaluating an enterprise, the computer system including: means for constructing an enterprise governance library from a set of enterprise governance documents, wherein each enterprise governance document in the set of enterprise governance documents includes natural language text defining at least a portion of the enterprise, and wherein the means for constructing includes: parsing the natural language text to identify a set of references relating to the enterprise, wherein each reference in the set of references identifies a key object relating to the enterprise, wherein the key object is one of: an organization of the enterprise, an agent of the enterprise, a product of the enterprise, or a product used by the enterprise; generating and storing structured data for the enterprise governance document and for each key object in a set of key objects based on the set of references identified in the natural language text, wherein the structured data for each key object includes: a plurality of attributes of the key object; data associating the key object with the enterprise governance document; and data for enabling access to data corresponding to the reference.

A third aspect of the invention provides a computer system including: a set of processors; a storage component coupled to the set of processors; and a visualization program stored in the storage component, wherein the visualization program comprises program code, which when executed, enables the computer system to implement a method of evaluating an enterprise, the method comprising: constructing an enterprise governance library from a set of enterprise governance documents, wherein each enterprise governance document in the set of enterprise governance documents includes natural language text defining at least a portion of the enterprise, and wherein the constructing includes: parsing the natural language text to identify a set of references relating to the enterprise, wherein each reference in the set of references identifies a key object relating to the enterprise, wherein the key object is one of: an organization of the enterprise, an agent of the enterprise, a product of the enterprise, or a product used by the enterprise; generating and storing structured data for the enterprise governance document and for each key object in a set of key objects based on the set of references identified in the natural language text in the storage component, wherein the structured data for each key object includes: a plurality of attributes of the key object; data associating the key object with the enterprise governance document; and data for enabling access to data corresponding to the reference.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 1 shows an illustrative enterprise architecture framework indicating areas of enterprise architecture addressed by an embodiment.

FIGS. 6A-6I show illustrative APIs for presenting portions of a model according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 2:
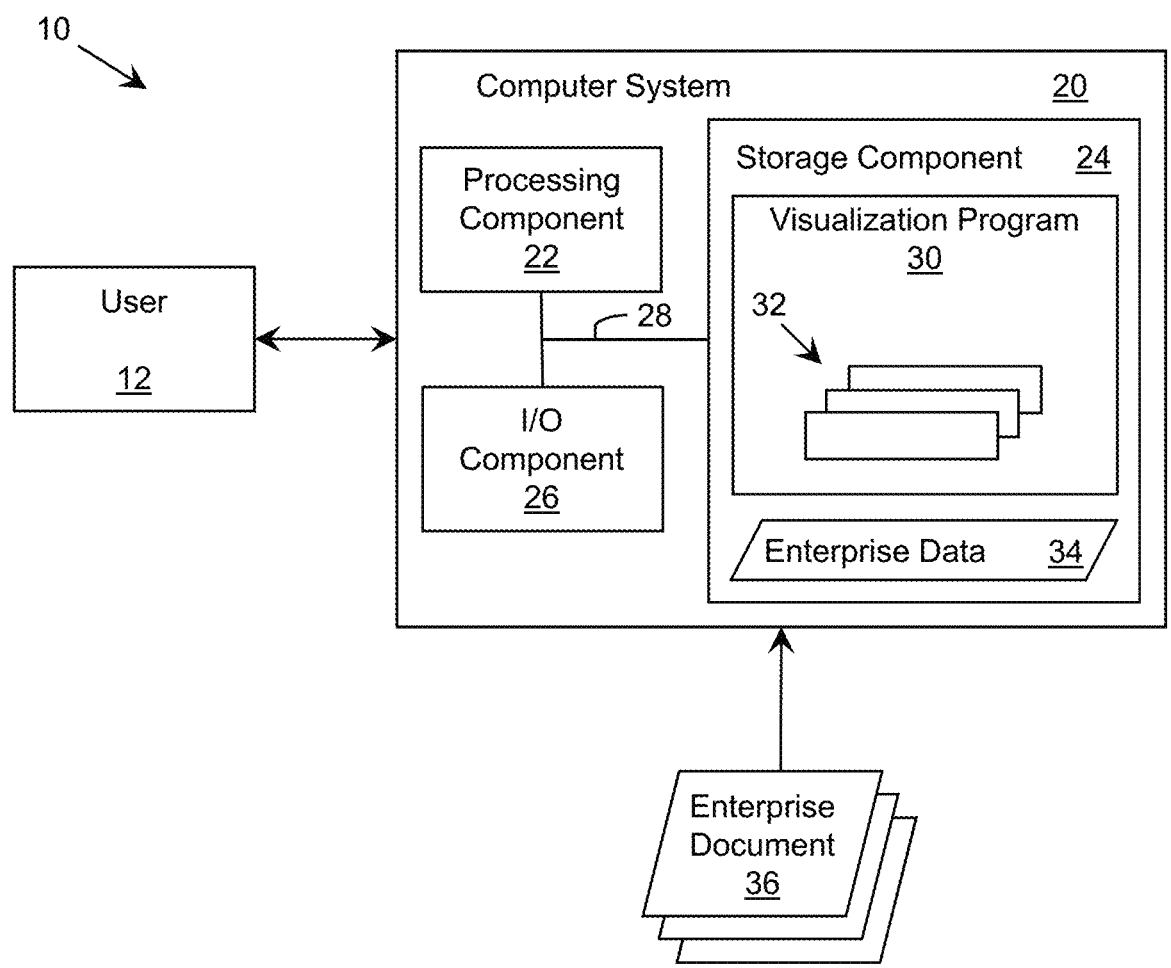
FIG. 2 shows an illustrative environment for modeling an enterprise architecture according to an embodiment.

As indicated above, aspects of the invention provide a solution for modeling an enterprise architecture. The model can include the strategic mission, vision, goals, objectives, policies, regulations, governance, and/or the like, which combine to define the nature of a complex system, such as for example, a systems enterprise composed of several integrated business systems and various information technology architectures. To this extent, aspects of the invention provide a solution for evaluating an enterprise. The solution can include constructing an enterprise governance library from a set of enterprise governance documents. Each enterprise governance document can include natural language text defining at least a portion of the enterprise. The enterprise governance library can be constructed by parsing the natural language text to identify a set of references relating to the enterprise and creating structured data based on the set of references. Each reference can identify a key object relating to the enterprise, such as an organization of the enterprise, an agent of the enterprise, a product of the enterprise, or a product used by the enterprise. The structured data for each key object can include attributes of the key object, data associating the key object with the enterprise governance document, and data for enabling access to data corresponding to the reference. The evaluation can include visualizing various aspects of the enterprise and/or recommending improvements to the enterprise. As used herein, unless otherwise noted, the term "set" means one or more (i.e., at least one) and the phrase "any solution" means any now known or later developed solution.

An embodiment provides a solution in which current, key enterprise documents can be parsed, tagged, and preserved as a semantic web-compliant digital library representing authorized enterprise governance. An embodiment can provide a holistic graphical and semantic model of the enterprise's organizational structures that communicate and collaborate to get the job done and still comply with laws, rules, and regulations, while achieving the strategic goals of the enterprise.

An embodiment provides an improved solution for modeling integrated business and information technology frameworks and architecture in support of a business. For example, such an embodiment can use Semantic Web standards to extract computer models from strategic business plans the business has already developed and implemented.

Furthermore, the embodiment can provide business personnel with natural language methods for articulating their requirements for new and improved technology in the form of computer models using open standards, which can meet a need for an authoritative strategic basis of the enterprise architecture at the highest levels.

Embodiments can aid an average user by offering novel visual cues for representing strategic enterprise knowledge, stored as natural language documents, as enterprise architecture models. Business metadata available in existing enterprise documentation can be directly used and accessed, e.g., via universal resource locator (URL) links. These visual links can overcome the difficulty in following threads without understanding the whole ontology. An embodiment can present the direct source of the business rules, and provide the graphical, integrated organizational structure necessary to produce more detailed activities regarding the products and services of the enterprise, e.g., the system and technology view of the architecture.

An embodiment provides a set of elements, defined in a formal schema, designed to present lists of information without having to construct creative searches. Instead of searching for one term of interest, users can be given lists of contents and visual graphics that allow them to get to the triple store (classes and predicates) of precise enterprise model information they desire. Furthermore, an embodiment can use key organizational social concepts to offer sets of data as visual cues for what is required. Still further, an embodiment provides a solution for constructing new enterprise architecture views that support modeling requirements for enterprise change and developing technology.

An embodiment can satisfy a need for an umbrella function capable of providing a flexible structure that objectively represents a holistic business enterprise. The embodiment can provide a meta-structure for enabling understanding enterprise-wide functions and necessary interactions between enterprise functions and organizational departments. The business data can be extracted directly from key enterprise documents that convey all the important guidance, policies, rules and regulations governing the production of products and services that are known to the enterprise manager, and in aggregation the meta-structure can present a holistic model view of the enterprise. Transformed into a graphical user application, this holistic model represents the basis for informing detailed business model views, including work flow project model views, of the enterprise. An embodiment can offer an enterprise architecture approach to close the gap in understanding what is needed to visualize and understand the strategic mission and vision of complex, system-of systems organizations, and provide a rapid way to articulate accurate models for future enterprise technology change.

Most business governance documents are written at a level that is sufficiently general so they can be used for a variety of situations and to satisfy a number of uniquely defined conditions and standards. As such, business governance document language can be literally the enterprise planner's own level of abstraction. Exploiting this level of brevity and generalization also allows this library of documents to be used as a semantic umbrella function that enables enterprise business personnel to assemble their own strategic models that represent the view of the most important elements of the enterprise when they are required to address specific standards and conditions their customers present. These rules can be considered as a set of minimum critical specifications. Violating them could result in serious consequences for enterprise customers or the strategic mission of the enterprise itself.

In an embodiment, the written documentation describing the enterprise is available in a format that can be electronically converted to hypertext mark-up language (html, xhtml, or similar). When aggregated, this set of electronic documents can become a digital library of the enterprise organization. An embodiment features a simple but effective data-tagging schema designed to accurately represent core elements of key enterprise publications. This solution of architecture-building validates the argument that important enterprise business documents are written to formally describe the flow of business responsibility for various governance functions from strategic management to functional business departments. Research conducted by the inventor reveals that, except for illustrative examples, enterprise governance documents left out the activity details regarding how these functions should be accomplished. Instead of a hierarchy of activities that assumes repetitive, assembly line production of goods and services; an embodiment can represent the enterprise as a type of dynamic social network. Major events in product or service production can be substantially represented using the data-tagging schema to identify relationships.

An embodiment of the data-tagging schema conforms to W3C standards for resource description framework (RDF) triples, e.g., the subject-predicate-object triples-format for more intelligent document use. An embodiment can append the social network W3C Friend-of-a-Friend (FOAF) standard and (foaf) xml namespace with an extended standard and namespace, referred to herein as (rqt). The (rqt) namespace extension provides a solution for documenting authorized communications between various groups involved in enterprise functions, and provides a basis for graphically modeling various creative social paths that enterprise personnel are authorized to use to perform business functions. An embodiment processes the governance documents for use as the RDF triple-store while retaining URL links to the enterprise digital library as the authorized source. Enterprise users may use standard RDF query tools to data-mine the body of governance elements, using various query methods, for example, XPATH.

In another embodiment, enterprise users can also access visual models in order to navigate enterprise governance information. These strategic views of the enterprise can illustrate organizations primarily focused on product and service production as well as critical linkages to organizations that provide supporting functions. An embodiment of an interface provides hyperlinks back to the original governance document in order to provide context to organizational elements selected and to remind users about the source of the requirement. Instead of a single-department view, users may choose to view functional swimlanes across the enterprise in order to identify the necessary holistic interconnections and links to the enterprise environment. In another embodiment, enterprise users can have an ability to graphically construct and preserve time-indexed scenarios that illustrate specific instances of enterprise interactions during the performance of enterprise operations. While users can retain an ability to add context to the selected elements of the scenario to further elaborate on an organizational issue, the elemental links back to the original governance documents remain with the scenario element for future reference. This configuration provides an opportunity to link other types of enterprise architecture models and tools that advertise an ability to capture activity details. This embodiment can provide a solution for aggregating models constructed in other proprietary architecture tools and a way to semantically map their models to a holistic enterprise governance architecture.

Turning to the drawings, FIG. 1 shows an illustrative enterprise architecture framework indicating areas of enterprise architecture according to the prior art. In an embodiment, one or more levels of the enterprise architecture can be addressed as discussed herein.

FIG. 2 shows an illustrative environment 10 for modeling an enterprise architecture according to an embodiment. To this extent, the environment 10 includes a computer system 20 that can perform a process described herein in order to model an enterprise architecture. In particular, the computer system 20 is shown including a visualization program 30, which makes the computer system 20 operable to model an enterprise architecture by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the visualization program 30, which is at least partially fixed in storage component 24. While executing program code, the processing component 22 can process data, which can result in reading and/or writing transformed data from/to the storage component 24 and/or the I/O component 26 for further processing. The pathway 28 provides a communications link between each of the components in the computer system 20. The I/O component 26 can comprise one or more human I/O devices, which enable a human user 12 to interact with the computer system 20 and/or one or more communications devices to enable a system user 12 to communicate with the computer system 20 using any type of communications link. To this extent, the visualization program 30 can manage a set of interfaces (e.g., graphical user interface(s), application program interface, and/or the like) that enable human and/or system users 12 to interact with the visualization program 30. Furthermore, the visualization program 30 can manage (e.g., store, retrieve, create, manipulate, organize, present, etc.) the data, such as enterprise data 34, using any solution.

In any event, the computer system 20 can comprise one or more general purpose computing articles of manufacture (e.g., computing devices) capable of executing program code, such as the visualization program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the visualization program 30 can be embodied as any combination of system software and/or application software.

Furthermore, the visualization program 30 can be implemented using a set of modules 32. In this case, a module 32 can enable the computer system 20 to perform a set of tasks used by the visualization program 30, and can be separately developed and/or implemented apart from other portions of the visualization program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 20.

When the computer system 20 comprises multiple computing devices, each computing device can have only a portion of the visualization program 30 fixed thereon (e.g., one or more modules 32). However, it is understood that the computer system 20 and the visualization program 30 are only representative of various possible equivalent computer systems that may perform a process described herein. To this extent, in other embodiments, the functionality provided by the computer system 20 and the visualization program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 20 includes multiple computing devices, the computing devices can communicate over any type of communications link. Furthermore, while performing a process described herein, the computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, the visualization program 30 enables the computer system 20 to model an enterprise architecture using enterprise data 34. The computer system 20 can obtain the enterprise data 34 using any solution. For example, the computer system 20 can generate and/or be used to generate the enterprise data 34, retrieve the enterprise data 34 from one or more data stores, receive the enterprise data 34 from another system, and/or the like. In an embodiment, the computer system 20 obtains and processes enterprise documents 36 to generate some or all of the enterprise data 34 using any solution. For example, the computer system 20 can parse, tag, preserve, and/or the like, information in the enterprise documents 36 as a semantic web-compliant digital library representing authorized enterprise governance, which the computer system 34 can store as enterprise data 34. Furthermore, the computer system 20 can generate and provide a set of visual representations of a model of the enterprise's organizational structures for presentation to the user 12 using the enterprise data 34. Each visual representation can illustrate at least a portion of the enterprise's organizational structures that communicate and collaborate to perform tasks required by the enterprise and still comply with laws, rules, and regulations, while achieving the strategic goals of the enterprise.

Figure 3A:
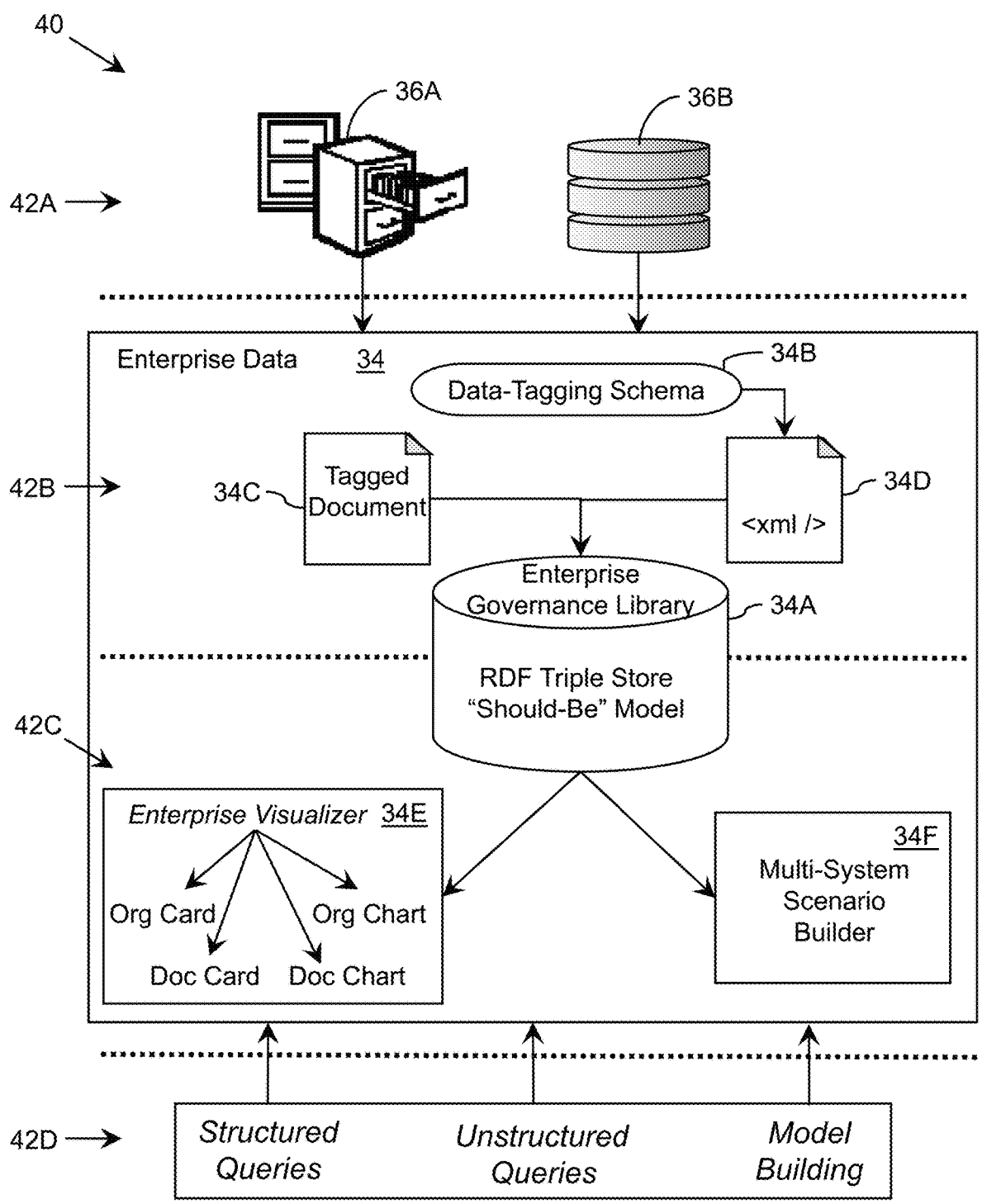
FIGS. 3A and 3B show an illustrative system architecture and navigation map, respectively, according to embodiments.
Figure 3B:
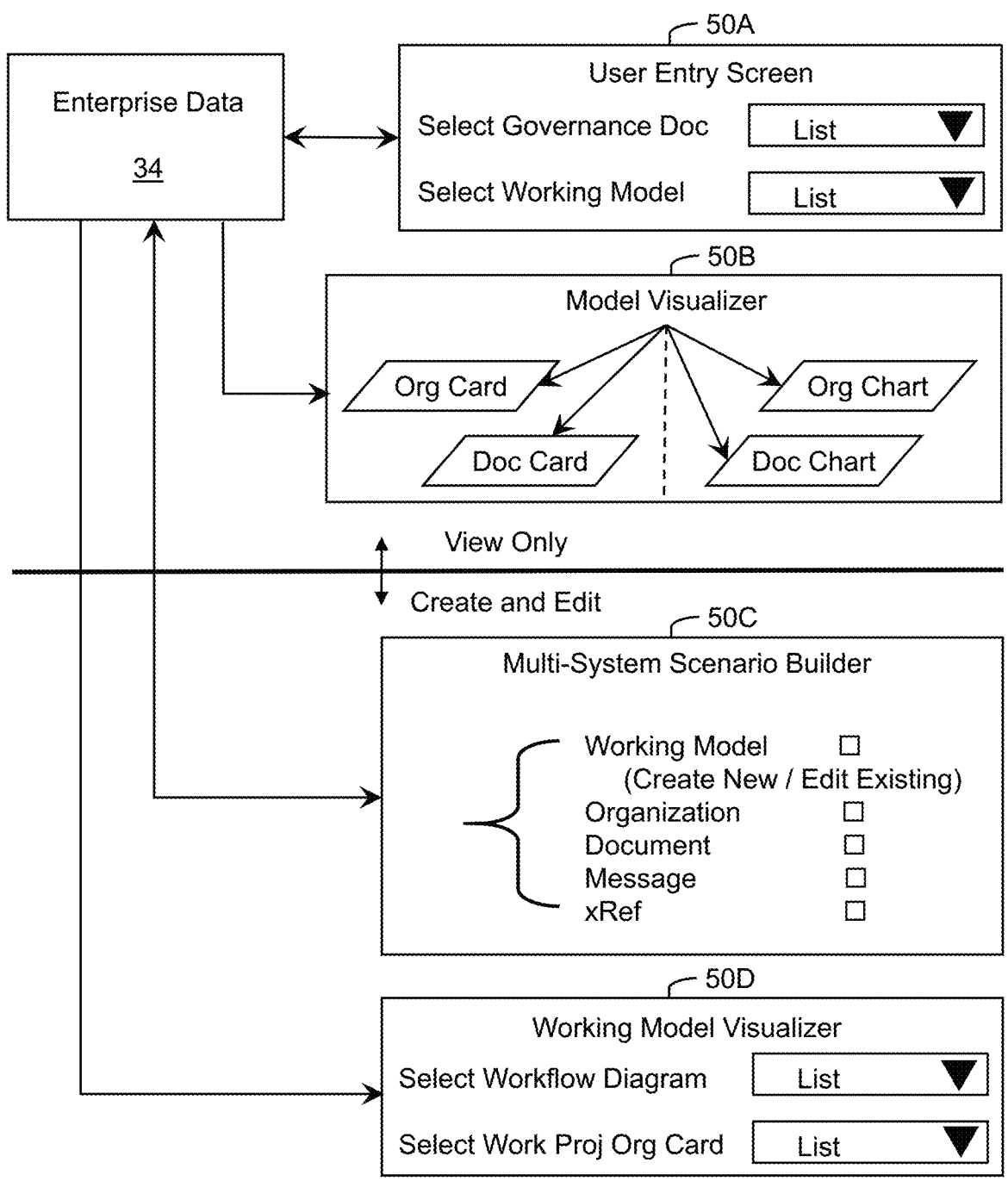

FIGS. 3A and 3B show an illustrative system architecture 40 and navigation map, respectively, according to embodiments. Referring to FIGS. 2 and 3A, the system architecture 40 can be configured to generate enterprise data 34 (e.g., knowledge content) and store the enterprise data 34 in an enterprise governance library 34A. Furthermore, the system architecture 40 can be configured to generate interfaces, such as graphical user interfaces, which provide various visualizations of portions of the enterprise data 34 stored in the enterprise governance library 34A for use by a user 12 in response to receiving an information request from the user 12. In an embodiment, the system architecture 40 can be viewed as a layered architecture including multiple layers 42A-42D. Each layer 42A-42D can be implemented using a set of components, e.g., a set of software modules 32 of the visualization program 30 being executed by a computer system 20. To this extent, it is understood that a layer 42A-42D can be implemented using a unique combination of components, while a component can be utilized in one or more layers 42A-42D.

Figure 4A:
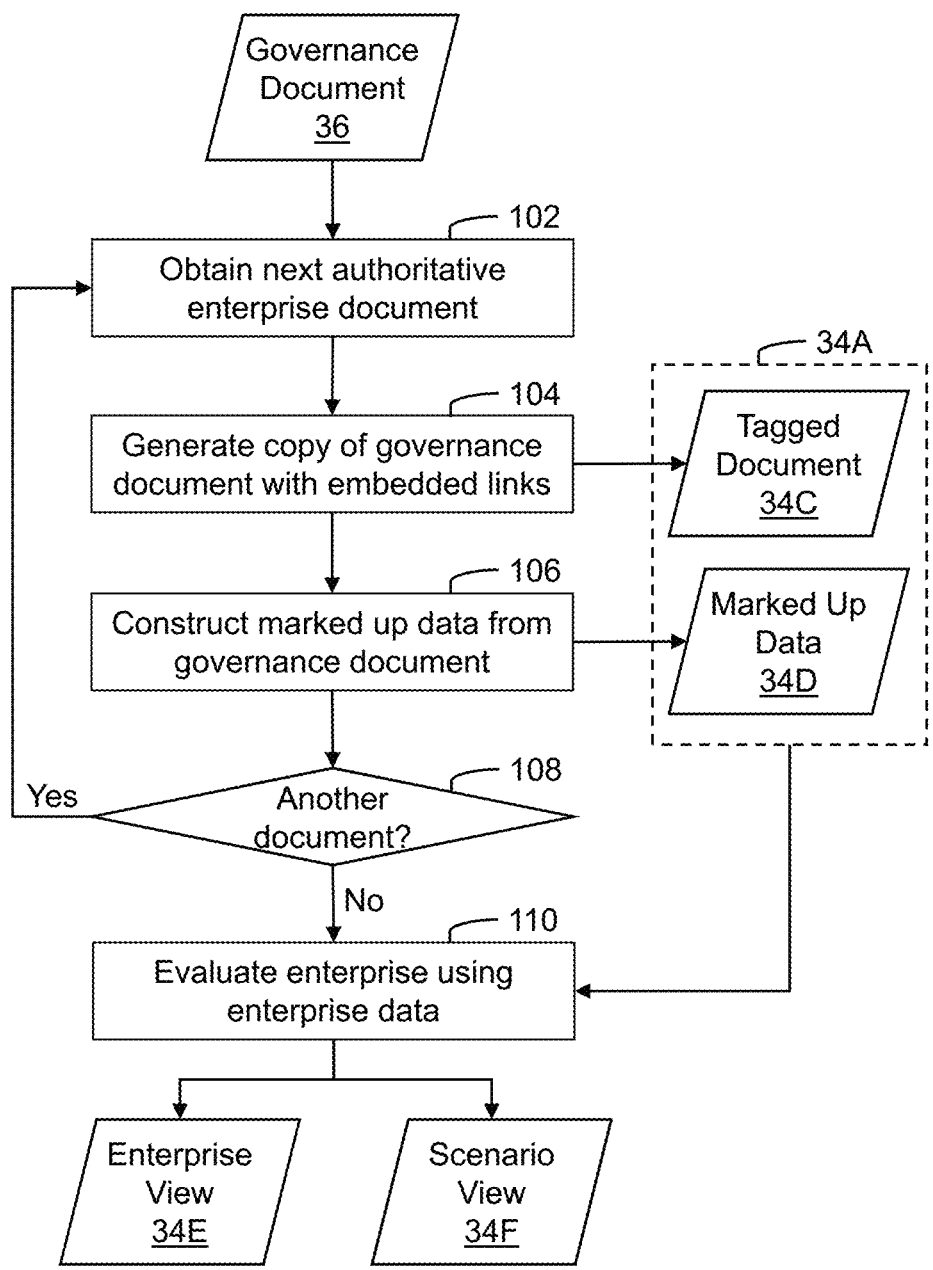
FIGS. 4A-4C show illustrative flow diagrams according to embodiments.
Figure 4B:
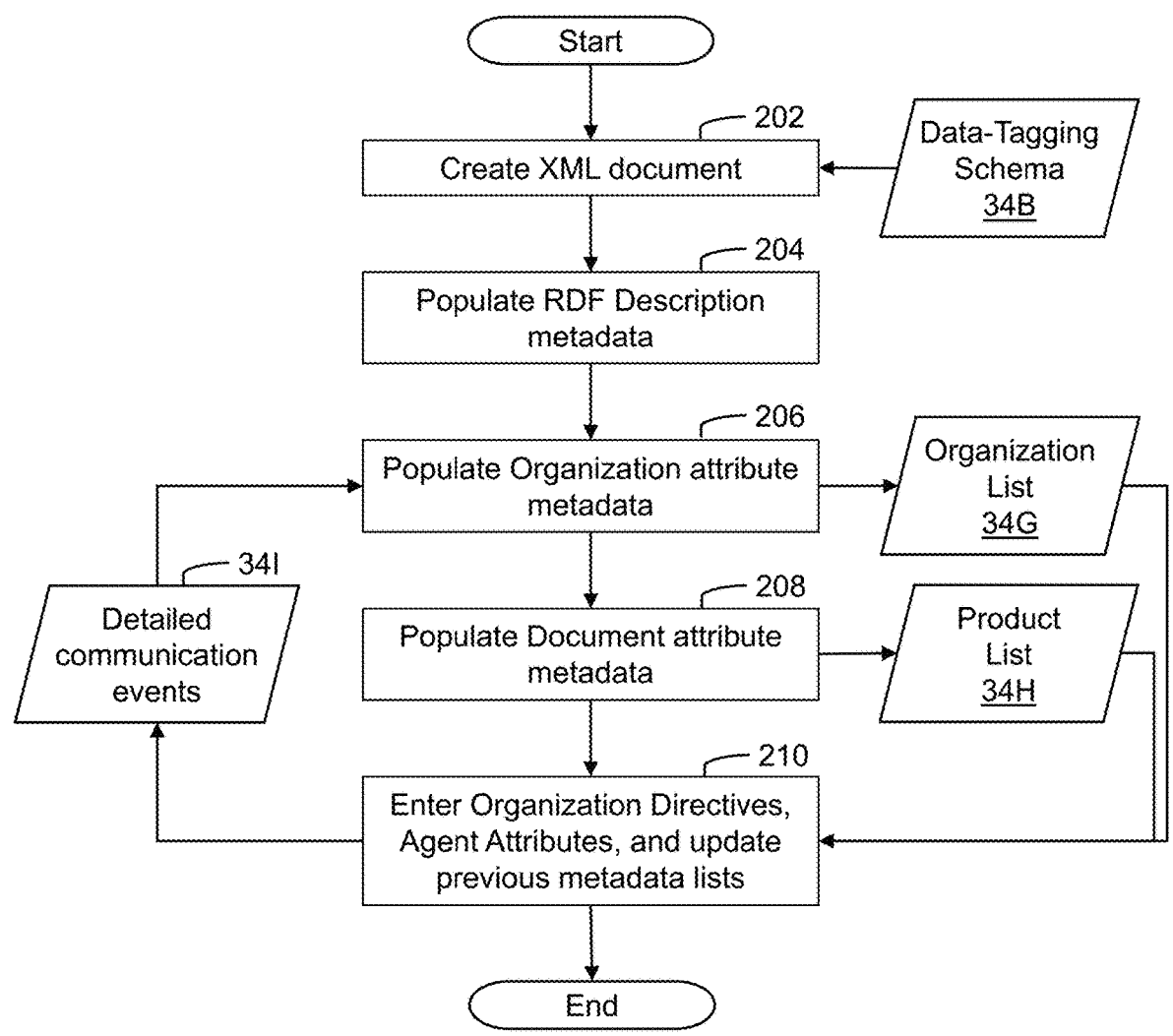
Figure 4C:
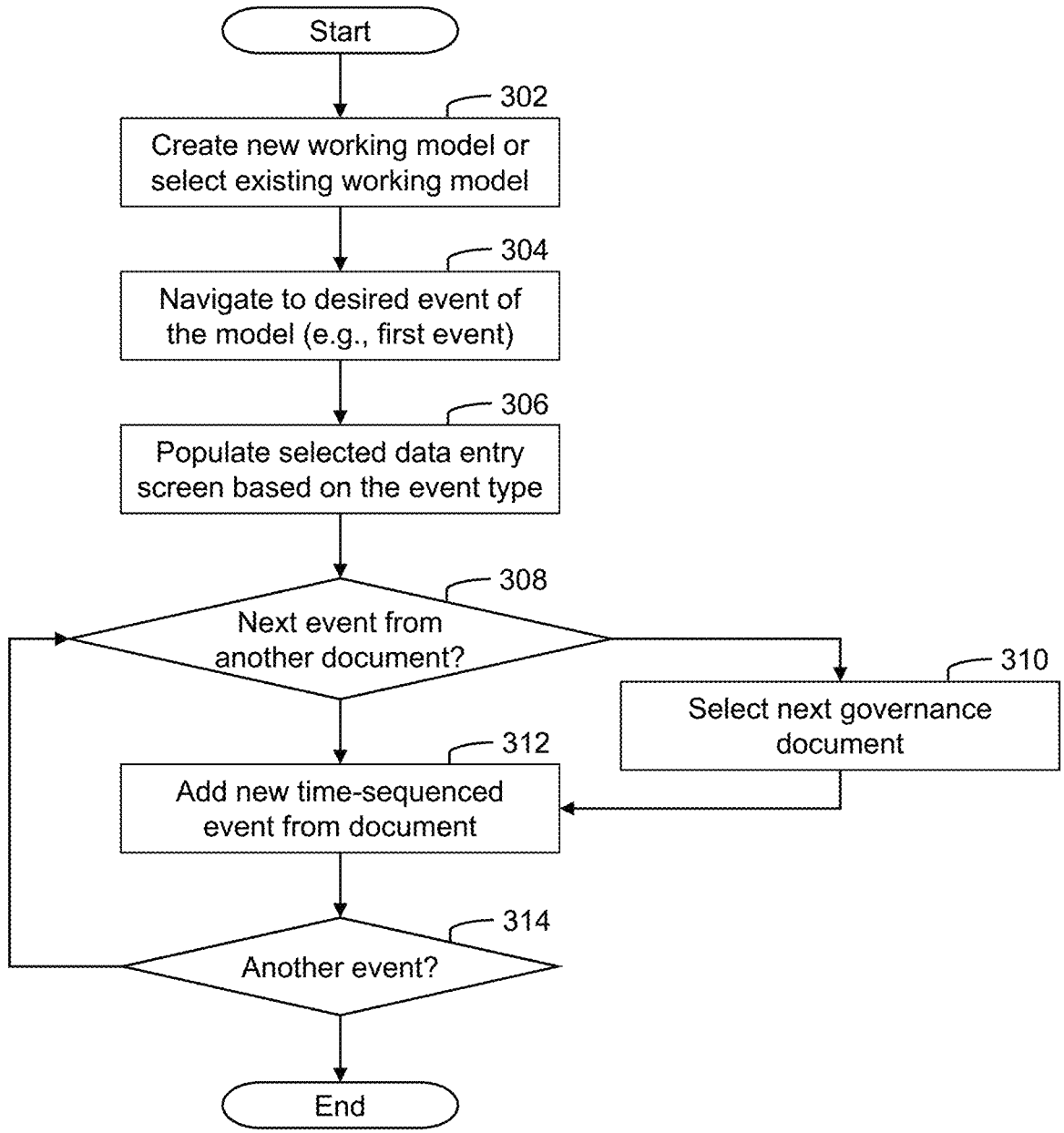

FIGS. 4A-4C show illustrative flow diagrams according to embodiments, which can be implemented by the computer system 20 (FIG. 2), e.g., by the layers 42A-42D shown in FIG. 3A, to model an enterprise. Referring to FIGS. 3A and 4A, in action 102, a data collection layer 42A can be implemented using a set of components configured to obtain input data 36A, 36B (e.g., enterprise governance document(s) 36) using any solution. Input data 36A, 36B can include various sources of information regarding the strategic goals and governance of the corresponding enterprise. The information can include natural language text, rich pictures, and/or the like, which can be processed as described herein. Such data 36A, 36B can store the information in any format. For example, input data 36A can comprise printed data, while input data 36B can comprise electronic data, which can include one or more files, a database, web data, and/or the like. Either type of input data 36A, 36B can be structured data (e.g., a spreadsheet, a relational database, and/or the like) or unstructured data (e.g., a word processing document). Unstructured data can comprise documents possessing a series of text lines and/or images. Documents that are included in the category of unstructured data may have little or no explicit or implicit metadata. Structured data may comprise a traditional database where information is structured and referenced. It is understood that these are only illustrative and various types of input data can be a combination of structured and unstructured data (e.g., semi-structured data). Regardless, each type of input data 36A, 36B can include multiple unique formats for storing data. For example, there are numerous formats of word processing documents, databases, spreadsheets, image files, email files, and/or the like.

A component of the data collection layer 42A can be configured to obtain the input data 36A, 36B using any solution. For example, the data collection layer 42A can include a set of components configured to enable a user 12 to identify input data 36A, 36B (e.g., via a user interface, or the like). Such input data 36A, 36B can be identified using any solution, such as by transferring the file via a file transfer protocol (FTP), browsing and selecting a storage location and/or set of files, and/or the like. For physical input data 36A, the data collection layer 42A can include a set of components for creating and identifying an electronic copy of relevant portions of the physical input data 36A, e.g., by scanning the page(s), recognizing the text (e.g., using an optical character recognition (OCR) solution), and/or the like. The electronic copy can then be processed as electronic input data 36B. Furthermore, the data collection layer 42A can include a set of components configured to automatically acquire electronic input data 36B, e.g., by crawling multiple data storage locations and extracting data therefrom. In an embodiment, a component of the data collection layer 42A is configured to utilize standards of the World Wide Web Consortium (W3C) regarding codifying files (e.g., XHTML standards) and identifying files (e.g., URL) in order to acquire input data 36B.

A data processing layer 42B can be implemented using a set of components configured to analyze the input data 36A, 36B, extract information therefrom, and store the extracted information in an enterprise governance library 34A. To this extent, in action 104, the data processing layer 42B can generate a copy of the governance document 36, which includes embedded links. For example, the data processing layer 42B can create a tagged document 34C, which is a copy of the governance document and includes embedded data for accessing each relevant portion of the governance document 36, and store the tagged document 34C in the enterprise governance library 34A. In a more particular embodiment, the tagged document 34C can include a set of document block locator tags, each of which enables access to a unique block of data (e.g., a paragraph, a chart, and/or the like) stored in the tagged document 34C. For example, the tagged document 34C can store the data in the portable document format (PDF) file format with block locator URL tags embedded therein.

In action 106, a set of components of the data processing layer 42B can be configured to construct marked up data 34D from the governance document 36 and store the data in the enterprise governance library 34A. In an embodiment, the data processing layer 42B can include sets of components configured to extract information from one or more formats of a particular type of input data 36B (e.g., structured, unstructured, semi-structured). In an embodiment, each component of the data processing layer 42B is configured to store the extracted information as marked up data 34D using a data-tagging schema 34B. For example, the data-tagging schema 34B can enable the extracted information to be abstracted, unified, and stored in the enterprise governance library 34A as marked up data 34D for later retrieval. In action 108, the data processing layer 42B can determine whether any additional input data 36B requires processing using any solution, and if so, the process can return to action 102.

In a more particular embodiment, the data-tagging schema 34B is an XML-based schema, which can enable retrieval of relevant data and presentation of the data in an RDF/XML-based document. In this case, the components of the data processing layer 42B can apply the relevant standards of the World Wide Web Consortium (W3C) regarding syntax (e.g., XML, NS, and XML Schema standards) when storing the extracted information using the data-tagging schema 34B. In a still more particular embodiment, the data processing layer 42B can be configured to store the extracted information using triple-store (e.g., subject, predicate, and object) knowledge objects, which can semantically associate data relating to organizational profile(s), relationships with other organization(s), and other elements, to holistically define the enterprise in terms of its current strategic and governance documentation, e.g., a model of the enterprise as it should be.

Figure 5A:
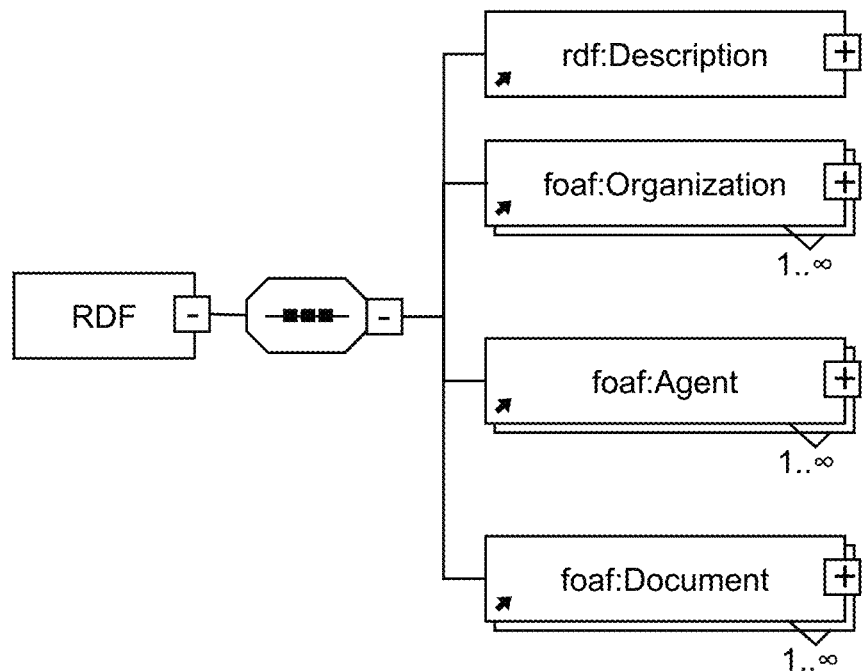
FIGS. 5A-5E show an illustrative data-tagging schema according to an embodiment.

A still more particular embodiment provides a novel data-tagging schema 34B, which is an extension of the FOAF W3C standard. Various portions of an embodiment of the data-tagging schema 34B are shown in FIGS. 5A-5E. FIG. 5A shows a first level of an illustrative data-tagging schema according to an embodiment. In this case, the first level includes three classes from the FOAF standard (each indicated by the "foaf:" prefix): organization, agent, and document. Additionally, a description class can correspond, for example, to the W3C standards for a general-purpose metadata language called resource description framework (RDF), as indicated by the "rdf:" prefix.

Figure 5B:
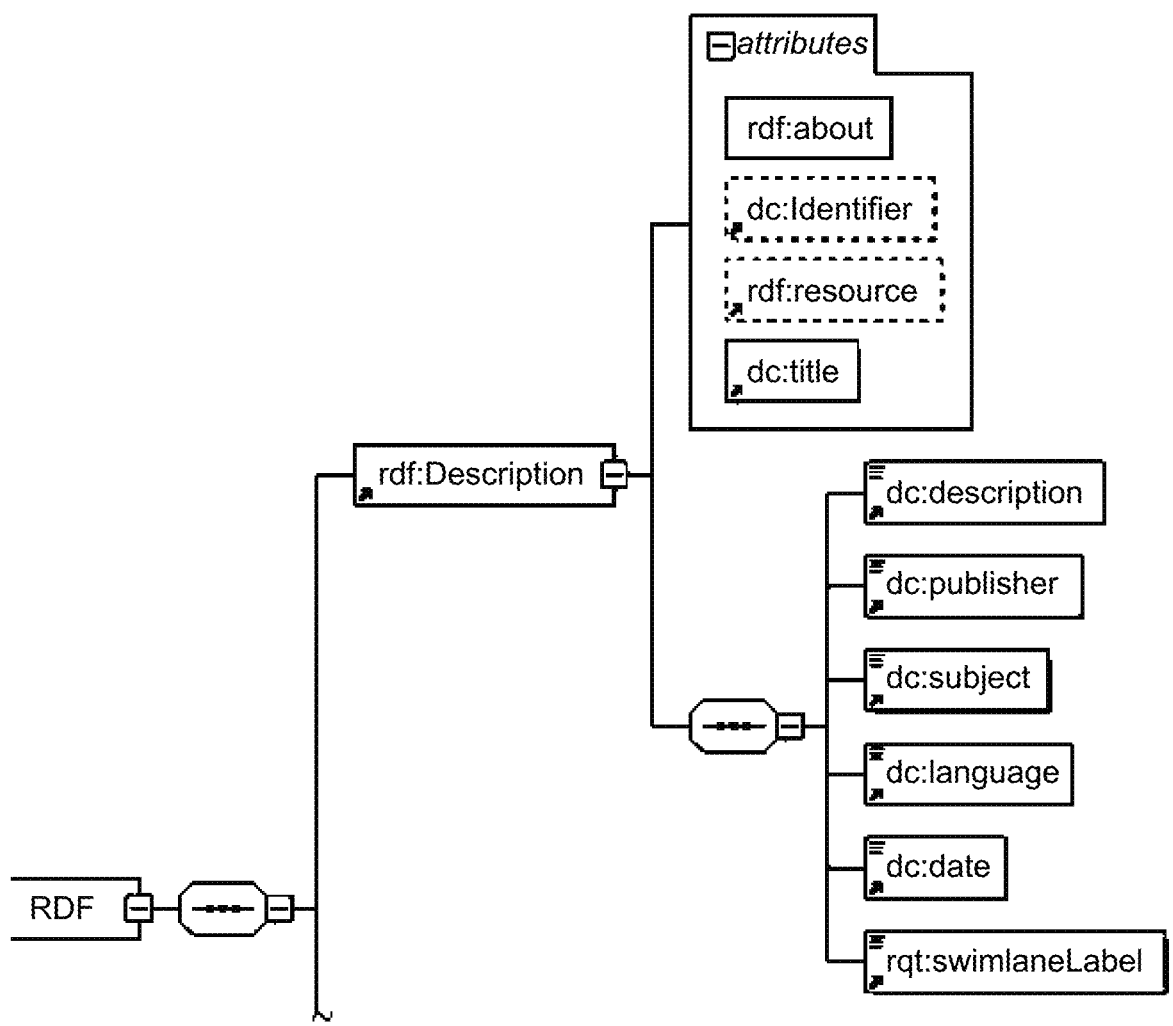

FIGS. 5B-5E show additional details of each of the first level classes shown in FIG. 5A according to embodiments. For example, FIG. 5B shows attributes of an illustrative description class according to an embodiment, which can be used to uniquely identify a source of data (e.g., a governance document 36) in the enterprise data 34 described herein. As illustrated, the description class can include various attributes, which can be incorporated from the RDF standard and the Dublin Core metadata element set (as indicated by the "dc:" prefix). An element of the description class can hold identification of the resource being described. Typically, the input data 36B will include more than one statement made about a particular resource. In this embodiment, the description class includes an attribute identifying a specific peer group recognized by an enterprise for the purpose of determining shared responsibilities during a business process. In FIG. 5B, this attribute is identified by "rqt:swimlaneLabel."

Figure 5C:
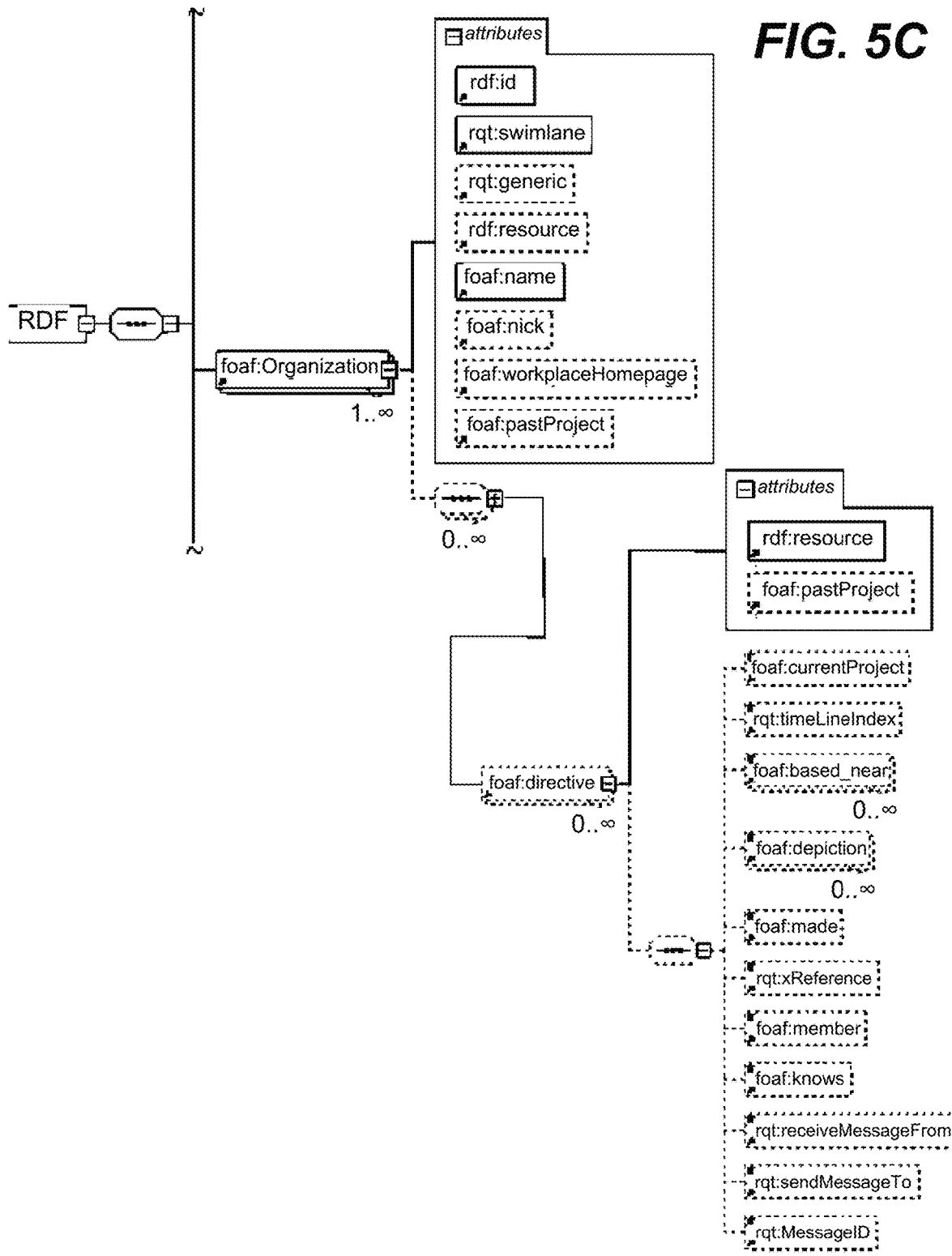

FIG. 5C shows an illustrative organization class of the data-tagging schema according to an embodiment, including its attributes and properties. As illustrated, in an embodiment, objects and predicates of the FOAF standard for the organization class are extended to include a predicate identifying the corresponding peer group ("rqt:swimlane") of the enterprise. Additionally, the namespace extends the organization class to include an attribute (e.g., a boolean value) indicating whether the organization is generic ("rqt:generic"). The generic attribute is useful when a natural language document describing an enterprise is processed. In this case, references to an organization can be by its technical name, its nickname, by actions it performs, or even its membership in a peer group of organizations. When the data processing layer 42B (FIG. 3A) cannot determine from the written word specifically which organization is the subject of the text, the alternate generic name can be used to relate the text to a generic organization. Extraction of the generic reference can allow the reference to be found by adding the name of the generic organization to the list of all organizations the enterprise has defined in their governance documents.

Furthermore, the organization class can be extended to include several additional properties. These properties can include a property indicating a corresponding time line sequence identifier ("rqt:timeLineIndex"). As described herein, this property can be utilized when sequencing a series of communications and/or operational events. Additionally, the list of properties can include a property indicating a cross reference ("rqt:xReference"), which can be used to associate a document with another document that it references and/or is referenced by. Furthermore, the list of properties can include properties corresponding to messages. The message-related properties extend the purpose of the FOAF standard. The FOAF standard can allow an organization to convey who it knows, but does not track what is communicated between entities and/or what event prompts the communications. The message-related properties can include: an element corresponding to an entity from which a message is received ("rqt:receiveMessageFrom"); an element corresponding to an entity to which a message is sent ("rqt:sendMessageTo"); and a message identification element ("rqt:messageID").

Figure 5D:
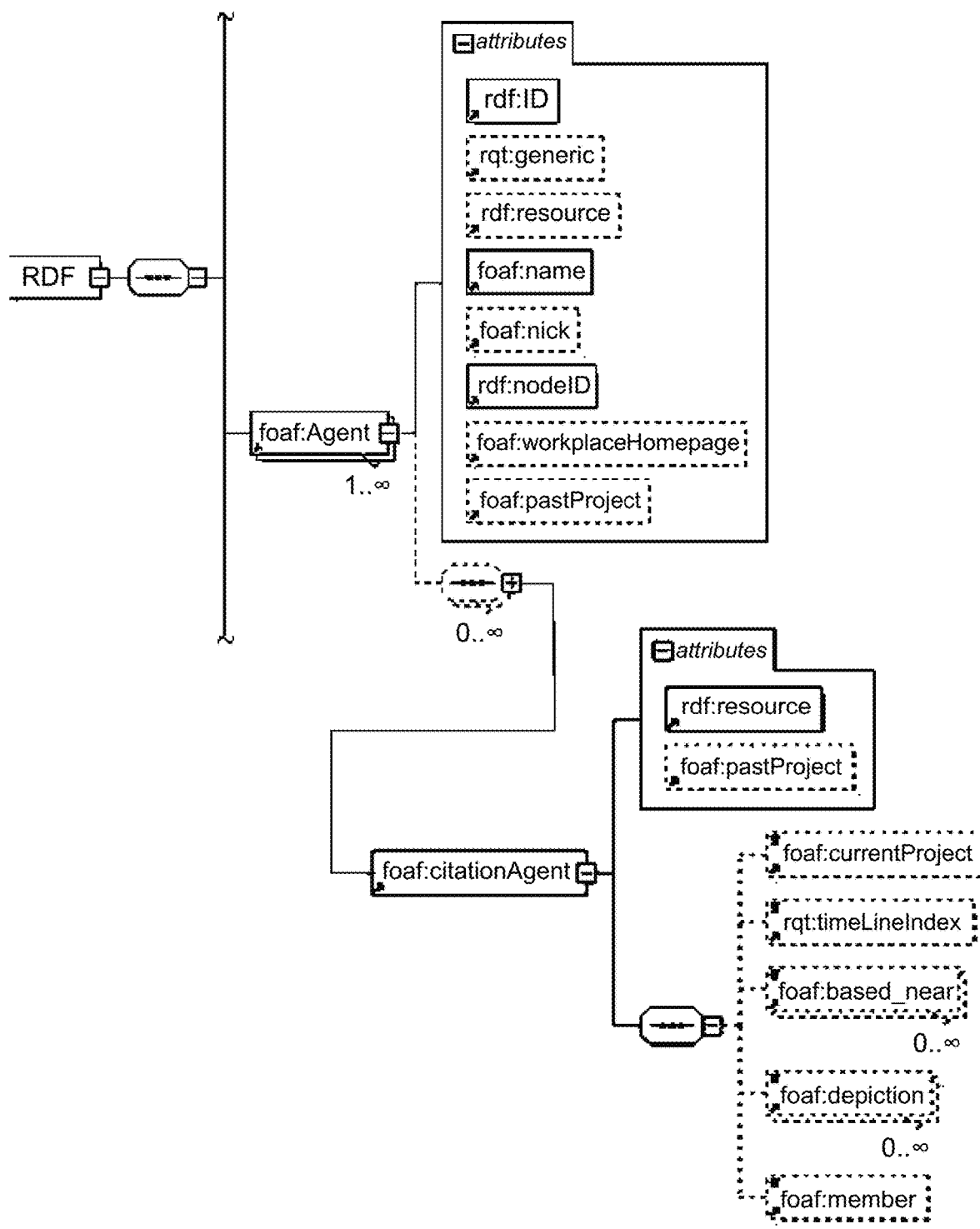

FIG. 5D shows an illustrative FOAF agent class of the data-tagging schema according to an embodiment, including its attributes and properties. The agent class can be used to capture natural language pertaining to a position within an organization. As such, the agent class can include an attribute (rdf:nodeID) that relates the agent with an identified parent organization. In this way, the elements of the agent can be included as elements of the organization as well. As illustrated, the agent attributes can be extended to include an optional property indicating whether the reference to the agent (e.g., in a natural language document) is generic ("rqt:generic"). Additionally, the agent class can include a set of elements to ensure data elements are stored together under the proper class header and after the required set of applicable attributes. In an embodiment, these elements can include: "directive," which relates to the organization class; "citationAgent," which relates to the agent class; and "citationDocument," which relates to the document class.

Figure 5E:
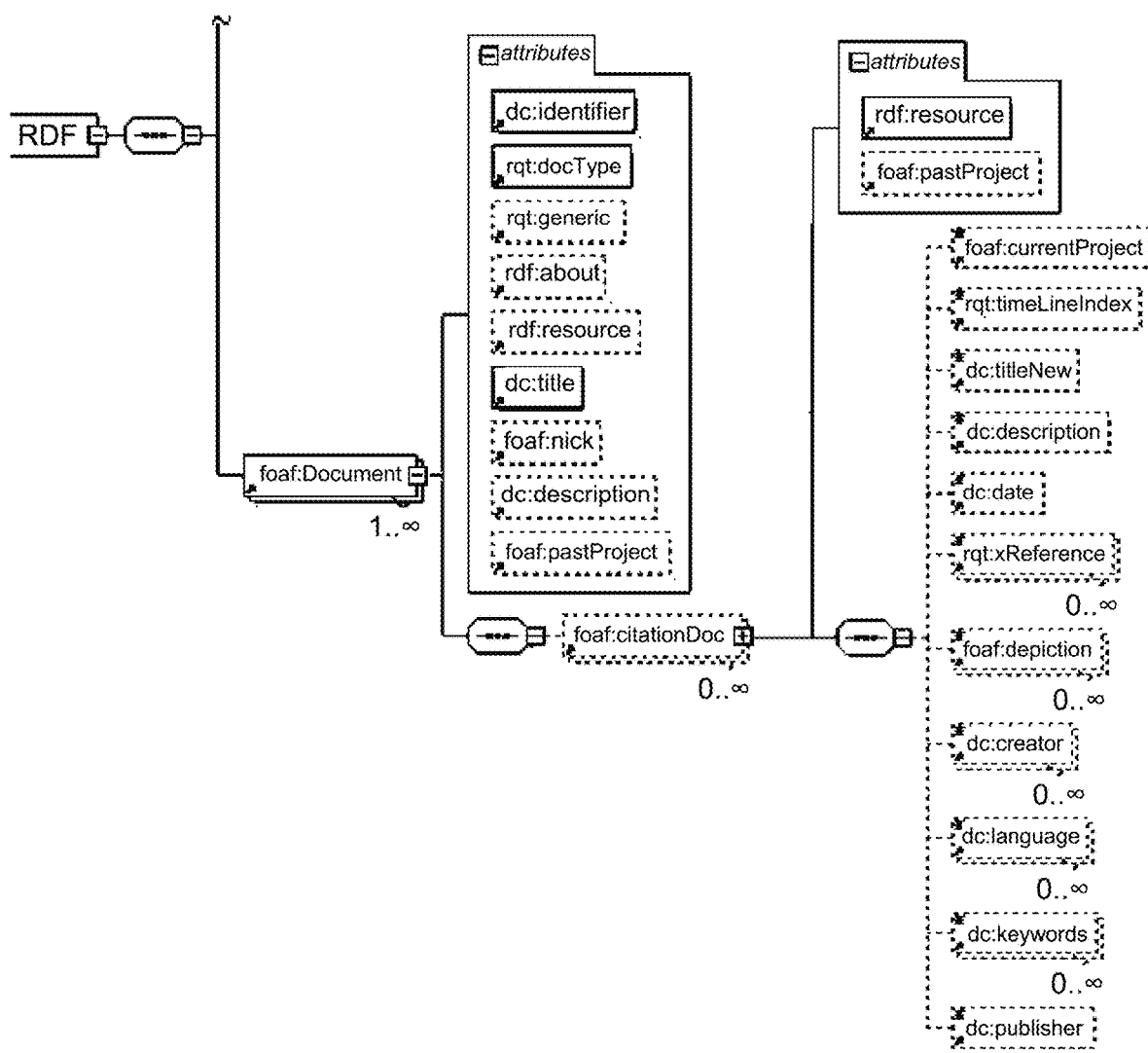

FIG. 5E shows an illustrative document class of the data-tagging schema according to an embodiment, including its classes and properties. As illustrated, in this embodiment, the Dublin Core document class can be extended to include elements used for identifying the specific type of document (e.g., document, message, xReference). Furthermore, the document class can be extended to include a property (rqt:generic) indicating whether the corresponding document is, for example, a template for a certain type of document, whether the corresponding document is a specific document, and/or the like.

Referring to FIGS. 3A and 4B, further details of an illustrative process for constructing marked up data using a data-tagging schema 34B is described. In particular, the process shown in FIG. 4B can correspond to use of the data-tagging schema shown in FIGS. 5A-5E. In action 202, the data processing layer 42B can create a new XML document based on the data-tagging schema 34B for storing marked up data 34D a new governance document 36 being processed using any solution. For example, the data processing layer 42B can use an automated, semi-automated, or manual process for naming and storing the XML document in an appropriate location. In action 204, the data processing layer 42B can populate the RDF description metadata with data corresponding to and/or extracted from the governance document 36 using any solution.

Subsequently, the data processing layer 42B can parse the data and identify references corresponding to key objects relating to the enterprise. These references can include generic (e.g., non-specific) references and/or specific references to a key object. Furthermore, a reference may be explicit (e.g., stated in the text) or implicit (e.g., identified based on context). Illustrative key objects include: an organization of the enterprise; an agent of the enterprise; a work product of the enterprise; internal and/or external resources used by the enterprise; authorized communication threads, which can include one or more documents, messages, organizations, etc.; and/or the like.

In action 206, the data processing layer 42B can parse the data and identify organization references and commence populating the organization attribute metadata. For example, the data processing layer 42B can automatically or semi-automatically identify references to each organization (e.g., by name, acronym, etc.) in the input data 36B. These references can be present in the text, attributes of a document, attributes of a rich picture, information embedded in a rich picture, and/or the like. The data processing layer 42B can associate the corresponding data (e.g., document) with each identified organization, agent, and/or the like. To this extent, the data processing layer 42B can generate an organization list 34G, which includes a preliminary list of organizations referenced in the governance document 36. In action 208, the data processing layer 42B can populate the document attribute metadata based on references to various products (e.g., documents, resources, and/or the like) in the governance document 36. To this extent, the data processing layer 42B can automatically or semi-automatically identify references to each product (e.g., by name, nickname, acronym, etc.) in the input data 36B using any solution. As part of this action, the data processing layer 42B can generate a product list 34H, which includes a preliminary list of products referenced in the governance document 36.

In action 210, the data processing layer 42B can enter organization directives and agent attributes referenced in the governance document 36, and generate data regarding the detailed communication events 341 (e.g., various business communication events) referenced in the governance document 36. In an embodiment, data corresponding to a communication event can be stored as a document of the type "message," and can include a title, author, description, one or more keywords, and/or the like. Furthermore, the data can include a list of one or more organizations who send the message and/or a list of one or more organizations who receive the message. As illustrated, the data processing layer 42B can use the organization list 34G and the product list 34H when storing the directive and agent information, e.g., in order to associate the agent and/or directive with the corresponding organization and/or product.

The communication events data 341 can be utilized to further refine the organization and document data, e.g., by performing a one or more subsequent passes through the governance document 36. In each subsequent pass, the organization list 34G and/or the product list 34H can be further refined and updated. For example, based on subsequent data, a generic reference to an organization or product may be able to be resolved to a specific organization or product. Furthermore, each subsequent pass can include a search for determining implication(s) of passing information between organizations and their agents and selecting a descriptive phrase from the description of the information exchange that can represent a message title. In this fashion, data corresponding to a business interaction can serve to: represent some event in time, e.g., when; represent who triggers the event by sending the message and who receives the message, describing what the event is about; and, by referencing the location in the governance document of the overarching requirement for the information exchange, provides why the communication is necessary.

In an embodiment, the data collection layer 42A identifies verbs and/or phrases associated with one or more organization, agent, document, etc., identified in the input data 36B. The data processing layer 42B can use the identified verb(s) to determine the type of association being described. For example, for verbs such as collaborate, liaison, coordinate, and/or the like, the data processing layer 42B can indicate that the corresponding organizations/agents communicate in both directions (e.g., receive messages from and send messages to) with one another, while a verb phrase such as communicates with, keeps informed, can be processed to indicate one way communication (e.g., sends messages to) between the corresponding organizations/agents. Similarly, the data processing layer 42B can process phrases to determine relationships. For example, phrases such as representatives from, comprise, or the like, used in conjunction with an agent and an organization can be processed as indicating that the agent is a member of the organization. It is understood that these are only illustrative examples and numerous other examples can be implemented using any solution. Regardless, once processed, the data processing layer 42B can present the newly processed data for review and/or confirmation by a user 12 using any solution (e.g., one or more of the interfaces described herein).

Referring again to FIGS. 3A and 4A, the enterprise governance library 34A can be utilized to present data regarding the enterprise to a user 12 (FIG. 2). To this extent, an application framework layer 42C can be implemented using a set of components configured to provide access to the enterprise governance library 34A to a user 12. The application framework layer 42C can provide an interface layer 42D, which enables a set of properly authorized users 12 to perform one or more management operations (e.g., view, edit, modify, delete, create, and/or the like) on the enterprise data 34. For example, the application framework layer 42C can provide an application program interface (API), which can allow users 12 to access and query the enterprise governance library 34A by submitting information requests through the API, which are subsequently processed by component(s) in the application framework layer 42C. Such requests can be in the form of structured queries, unstructured queries, model building, and/or the like, and can be defined and submitted using an interactive form.

In action 110, the application framework layer 42C can enable user(s) 12 to evaluate the enterprise using the enterprise government library 34A. In an embodiment, the application framework layer 42C can include component(s) to generate interactive forms that allow user(s) 12 to visualize the data stored in the enterprise government library 34A according to preferences set by the user 12 (which can be stored as enterprise data 34, provided by the user 12, and/or the like).

Furthermore, the application framework layer 42C can include component(s) to enable a user 12 to construct a scenario or use case from the data stored in the enterprise government library 34A. In this case, such a scenario, use case, or the like, can be stored as enterprise data 34 for further use by the user 12, another user, and/or the like. To this extent, a model created by one user 12 can be shared with various other users including, for example, enterprise department owners, system designers, technology builders, and/or the like. Furthermore, a model can provide a basis for generating a detailed representation for managing change to an enterprise, which can be shared within the enterprise, provided to a sub-contractor, and/or the like. In an embodiment, the application framework layer 42C can enable a user 12 to also access data stored separately from the enterprise government library 34A, e.g., on a user device, another network location, and/or the like. Such data can be used by the application framework layer 42C to manage the enterprise data 34. Additionally, such data can include, for example, the original input data, such as a governance document 36, which can be stored and maintained separate from the enterprise data 34, but accessed by a user 12 using an interface described herein.

To this extent, FIG. 3B shows an illustrative navigation map for accessing interactive forms using an API according to an embodiment. As illustrated, the API can enable a user 12 to open forms in a view only or create and edit mode. To this extent, the API can generate various interfaces for presentation to the user 12, which can enable the user to: select enterprise data 34 to be viewed (e.g., a document, a working model, and/or the like); present enterprise data 34 to the user (e.g., a model visualizer); enable the user 12 to define a new scenario (e.g., working model, organization, document, message, xRef, and/or the like); present a enterprise data 34 (e.g., a workflow diagram, a work project organization card, and/or the like) in an interface that enables the user 12 to make one or more modifications; and/or the like.

As described herein, an embodiment provides a solution for visualizing a model, which is stored as enterprise data 34. As shown in FIGS. 3A and 4A, the application framework layer 42C can generate one or more types of enterprise views 34E, which can provide a user 12 with a visual representation of one or more aspects of a model of the organization of the enterprise. For example, such interfaces can include combined enterprise scope and departmental views for the enterprise. Furthermore, the application framework layer 42C can generate one or more types of scenario views 34F for the enterprise. These views can enable a user 12 to visualize a model of a work flow of the enterprise. Such a model can show how the enterprise performs work to complete a given task. In this case, the model can be utilized to address problems in the way that the enterprise completes the task. Alternatively, a scenario view 34F can be used to define a model of how the enterprise should complete a new task, propose a change to a current work flow, and/or the like.

Illustrative APIs for presenting portions of models of an enterprise are shown in FIGS. 6A-6I. Each of the APIs 52A-52I can display a portion of the enterprise data 34. In an embodiment, data displayed in an API 52A-52I is derived from data stored in the enterprise governance library 34A, which can include data stored in the data-tagging schema described herein. Furthermore, each API 52A-52I can include a set of mechanism enabling a user 12 to navigate through portions of the enterprise data 34 (e.g., through the data-tagging schema).

Figure 6B:
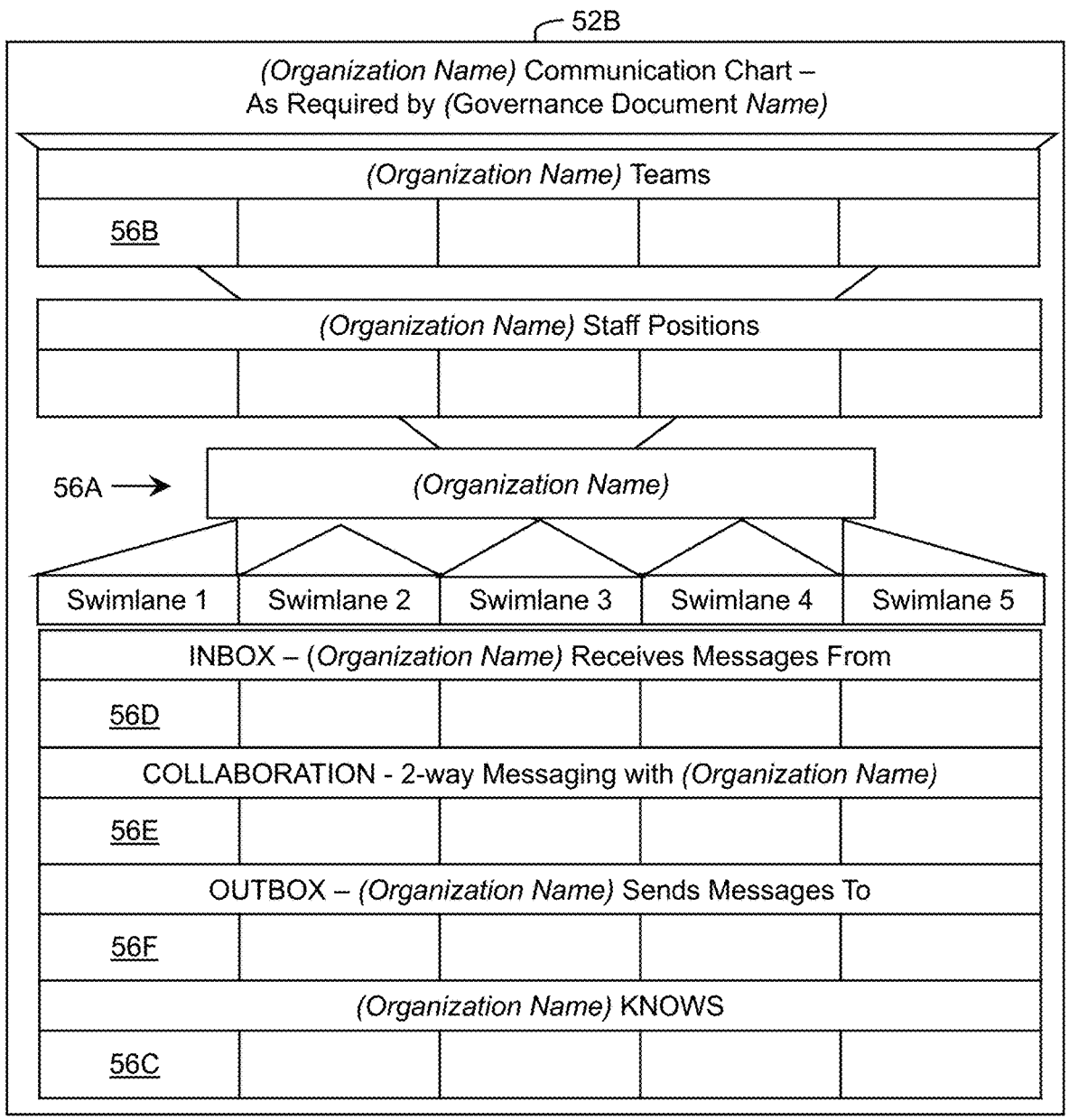

FIGS. 6A-6E present various views of a model of the enterprise organization according to embodiments. FIG. 6A shows an illustrative organization card API 52A according to an embodiment. The organization card API 52A can display various data corresponding to an organization, which can be stored using the data-tagging schema described herein (e.g., the organization class shown in FIG. 5C). As used herein, "organization" can refer to a peer group recognized by the enterprise. Illustrative peer groups can include a department, board, bureau, center, cell, working group, and/or the like. Additionally, a given peer group may include multiple sub-groups (e.g., teams), each of which comprises an "organization." Similarly, an organization can be a peer group external to the enterprise, such as a service provider, a customer, and/or the like.

The organization card API 52A can include attributes 54A of the corresponding organization, as well as location(s), membership (agents, individuals, and/or the like), products, and communications relating to the organization. Furthermore, the organization card API 52A can include links to enable the user 12 (FIG. 2) to navigate the information and/or obtain data regarding the source(s) of the information. For example, the interface 52A can include hyperlinked data items 54B in the various tables (e.g., locations, membership, products, communications). In response to a user 12 clicking on the hyperlink 54B, the computer system 20 can present the user with a view of at least a portion of a data source (e.g., a document) from which the computer system 20 derived the information. For example, the computer system 20 can use data stored in the marked up data 34D to access and present data in the tagged document 34C which corresponds to the reference responsible for the data entry. Furthermore, the interface 52A can include a link 54C (e.g., a thumbnail showing the separate view), which enables the user 12 to select to have the computer system 20 generate an interface presenting a display for the entire organization, such as the interface 52B shown in FIG. 6B.

FIG. 6B shows an illustrative organization communication chart API 52B according to an embodiment. As illustrated, the interface 52B can include the organization name 56A located in a central portion of the display area. Above the organization name 56A, the interface 52B can display a set of team(s) and a set of staff position(s) for the organization. As used herein, a "team" can correspond to a group of individuals associated with the organization and tasked with performing a related group of functions. Staff positions can include various job titles, which can be associated with the organization. Below the organization name 56A, the interface 52B can include a set of columns of data referred to as "swimlanes." In an embodiment, each swimlane corresponds to peer group of an organization. In this case, each team can be associated with one of the swimlanes, which can include one or more teams of the organization. In an embodiment, each team of the organization is visually associated with a corresponding swimlane, e.g., by using a unique background color for the associated cells. Data displayed within a boundary of a swimlane can include data regarding the communications of the corresponding team. The data can include, for example, data regarding other enterprise organizations from which the team receives communications, to which the team sends communications, with which the team collaborates (two-way communications), and/or of which the team knows (e.g., referenced in documents generated by the team).

The interface 52B can include various mechanisms for enabling the user 12 to navigate to other data and/or obtain additional data. For example, an organization name included in the cell 56B and/or another organization name included in a cell 56C-56F can be a hyperlink, which when selected, causes the computer system 20 to display information on the corresponding organization in an organization card API 52A. For the message data included in cells 56D-56F, in response to a user 12 hovering over the cells 56D-56F, the computer system 20 can display a set of message titles, or the like, for the corresponding communications, e.g., in a pop-up window or the like. Furthermore, in response a selection of one of the message titles, the computer system 20 can generate a message card API 52E (FIG. 6E) for the corresponding message.

FIG. 6C shows an illustrative document card API 52C according to an embodiment, which also can be used to visualize cross-referenced documents data (e.g., when the document type is "xReference"), access documents via a URL (when available), and/or the like. To this extent, the interface 52C can include various attributes 58A of the document, including the type of document, the corresponding URL, and/or the like. Furthermore, the interface 52C can include a set of keywords identified in the document, as well as details regarding the document creation. As described herein, the data displayed in the table cells, such as the cell 58B, can be hyperlinked such that, in response to selection by the user, the computer system 20 can display information regarding how the data was derived (e.g., a block of text surrounding a keyword, document information corresponding to the detail, and/or the like) in a popup window or the like. In an embodiment, in response to the user 12 hovering over a keyword, the computer system 20 can display a bullet list of documents that also include the same keyword in a pop-up window, and on selection of a document from the list, the computer system 20 can display a document card API 52C for the document. Furthermore, the interface 52C can include a thumbnail 58C, which enables the user 12 to select to display a document template, document depiction, document attachment, and/or the like, in another window.

FIG. 6D shows an illustrative document reference chart API 52D according to an embodiment. The interface 52D can display the name of the document 60A in a central portion of the display area. Below the document name 60A, the interface 52D can display tangible attributes corresponding to the document, such as a set of keywords associated with the document (e.g., located within the document). Above the document name 60A, the interface 52D can display relationships, such as documents that refer to the document (reference documents), documents that refer to the reference documents, and/or the like. In each case, a document/cross-reference name can be a hyperlink, in response to which the computer system 20 can generate a document card API 52C for the corresponding document. For each of the keywords, the computer system 20 can generate a popup window showing a list of relevant document titles, message titles, and/or the like, matching the keyword, which can be hyperlinked to enable the user 12 to selectively open a corresponding document card API 52C or message card API 52E for a corresponding selected item in the list.

Figure 6E:
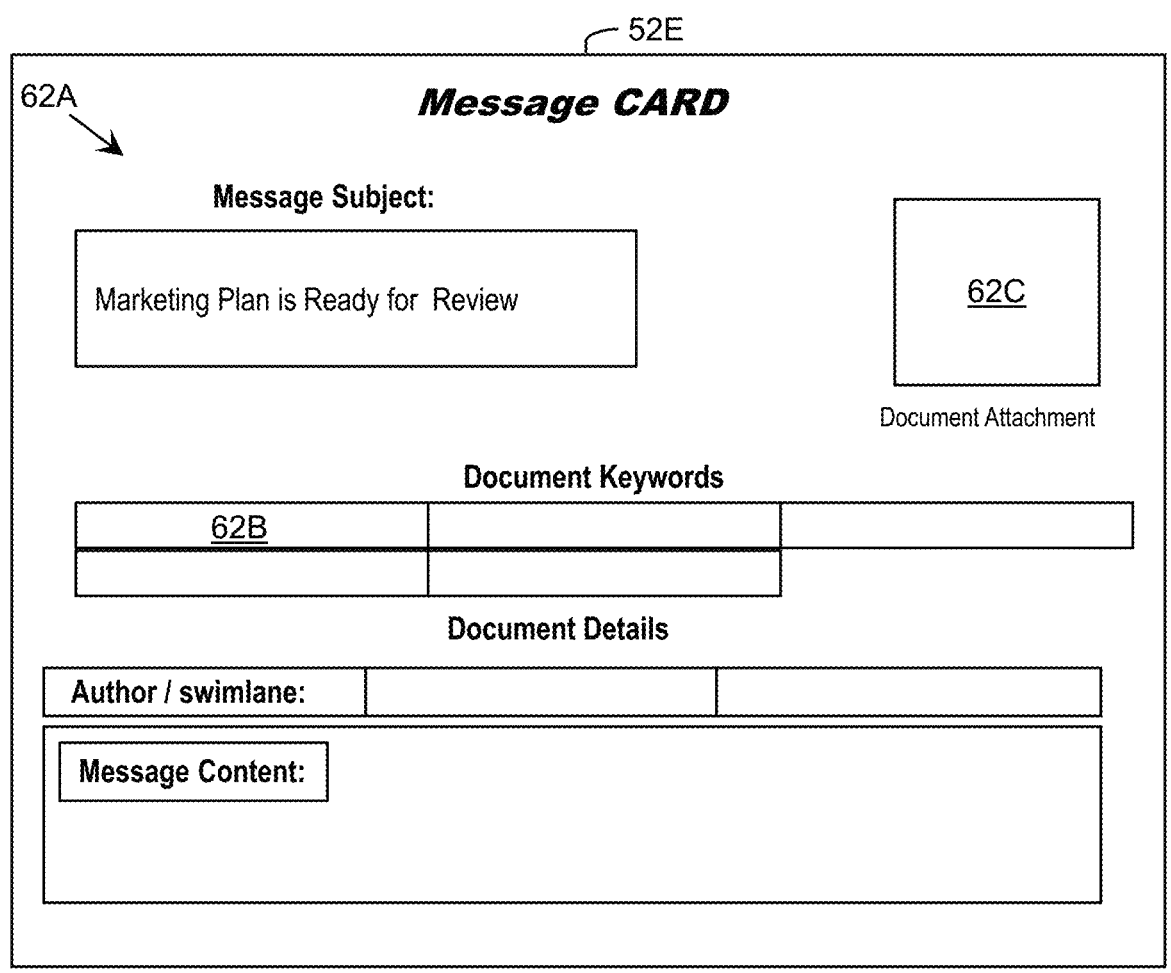

FIG. 6E shows an illustrative message card API 52E according to an embodiment. Similar to the document card API 52C, the interface 52E can include various attributes 62A of the message, such as the subject of the message, at least a portion of the message content, the author, and/or the like. Furthermore, the interface 52E can include a set of keywords identified in the message, as well as details regarding the message creation. The data displayed in the table cells, such as the cell 62B, can be hyperlinked such that, in response to selection by the user, the computer system 20 can display information regarding how the data was derived (e.g., a block of message text surrounding a keyword, message information corresponding to the detail, and/or the like) in a popup window or the like. Furthermore, the interface 52E can include a thumbnail 62C, which enables the user 12 to select to display a document attached to the corresponding message in another window An embodiment of the computer system 20 enables a user 12 to create, view, and modify models of various scenarios. A scenario can define how a problem presented to the organization will be resolved. The problem can be any type of problem, including creation of a new product, offering of a new service, handling of an event (unexpected or expected), and/or the like. A scenario can be used to define the organization as it is currently configured ("as-is") or used to define how the organization could/should be ("to-be"). Scenario development can include: identifying a set of main tasks; defining details for each main task (e.g., who will perform, prerequisites required, and/or the like); identifying milestones; ordering the tasks/milestones in a logical sequence (including parallel performance, when possible); and/or the like. As described herein, to accommodate scenarios, the data-tagging schema can include an attribute indicating the current work project (e.g., scenario) for the corresponding document, agent, or organization, and a time line index, which can be used to sequence the various tasks/events.

Figure 6F:
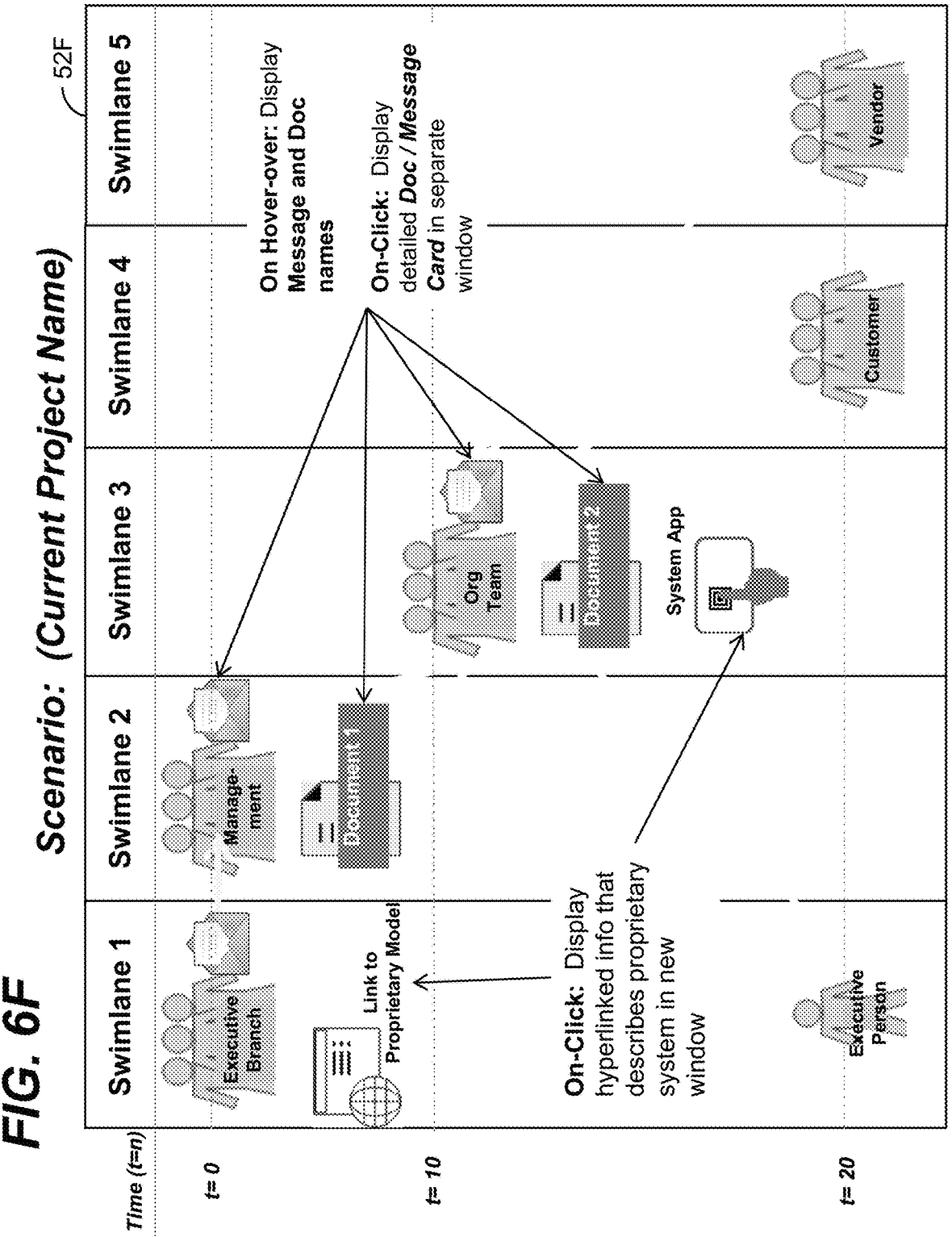

FIGS. 6F-6I present various views for presenting a model of a process flow of the enterprise organization according to embodiments. FIG. 6F shows an illustrative work project (e.g., scenario) builder API 52F according to an embodiment. As illustrated, the interface 52F can include multiple swimlanes (columns) each of which can correspond to a unique one of a plurality of organizations associated with an enterprise. The interface 52F can include various mechanisms, which enable a user 12 to place icons on the various swimlanes representing organizations (e.g., one or more agents of an organization), documents, messages, and/or the like, and define the data stored in the enterprise governance library 34A corresponding to each of the icons using any solution. For example, after placement on the interface 52F, the user 12 can select the icon to open a corresponding organization, document, message, or agent card API described herein. Furthermore, the interface 52F can enable the user to identify key time line locations, flows defining prerequisites, and/or the like. Using the interface 52F, a desired scenario can be graphically presented, defined, modified, and/or the like. The scenario can be stored as enterprise data 34 (e.g., using the data-tagging schema described herein) for subsequent presentation, implementation, modification, and/or the like.

In an embodiment, the computer system 20 stores a work project by accessing and making a copy of enterprise data 34 corresponding to a key object included in the work project. The user 12 can edit the copy of the enterprise data 34 according to a set of desired specifications. The copy can be saved as marked up data, which inherits the properties and linkages of the original enterprise data 34 for the key object, but is unique only to the specific work project. Furthermore, as part of editing and defining a work project, the user 12 can create a work project timeline key object, which is based on requirements not originating in any of the listed reference governance documents, and the computer system 20 can store data for the work project timeline key object as enterprise data 34 for the work project. The data can include, for example, one or more hyperlinks to URLs outside the enterprise governance library 34A. The computer system 20 can store the information within the structure of the XML document, such that information from outside source(s) can be linked to key objects within the enterprise governance library 34A, thereby enabling the enterprise evaluation to include more information.

FIG. 6G shows an illustrative work project organization card API 52G according to an embodiment, which can be utilized to visualize a work project (e.g., a scenario defined using the scenario builder API 52F, a completed work project, and/or the like). As illustrated, the interface 52G can include similar attributes and other data, as well as mechanisms for navigating the data, as included in the organization card API 52A. However, the interface 52G also can include additional data relating to the work project, such as a time index for a corresponding product, linked system, communication, or the like. In an embodiment, some of the data, such as organization locations and members of the organization, can include all locations/members of the organization, not just those locations and members assigned to the corresponding work project. Alternatively, the interface 52G can include only the subset of locations and members associated with the work project. The products and communications listed in the interface 52G can correspond to those products and communications required and/or performed as part of completing the work project.

Figure 6H:

FIG. 6H shows an illustrative work project message card API 52H according to an embodiment, which can display information for a message defined as part of a work project (e.g., scenario). As illustrated, the interface 52H can include similar attributes and data as included in the message card API 52E. However, the interface 52H also can include additional data relating to the work project, such as a time index for the corresponding message. When creation of the message as part of the work project has not yet been completed, it is understood that some of the data shown in the interface 52H (e.g., message content) can be blank and/or modified once the message is created.

FIG. 6I shows an illustrative work project document card API 52I according to an embodiment, which can display information for a document defined as part of a work project (e.g., scenario). As illustrated, the interface 52I can include similar attributes and data as included in the document card API 52C. However, the interface 52I also can include additional data relating to the work project, such as a time index for the corresponding document. When creation of the document as part of the work project has not yet been completed, it is understood that some of the data shown in the interface 52I can be blank and/or modified once the document is created. Additionally, the interface 52I can be used to present data on a linked system (e.g., a proprietary system application) used as part of the work project. In this case, the thumbnail 64 can be used to access the linked system.

Referring to FIG. 3B and FIGS. 6A-6I, an illustrative navigation sequence that allows a user 12 to access and query the enterprise data 34 is described. Initially, the computer system 20 (FIG. 2) can present a user 12 (e.g., previously authenticated by the computer system 20) with an interface (e.g., a graphical user interface, such as one shown in FIG. 3B) enabling the user 12 to select the type of information of interest. For example, the computer system 20 can generate any of various interfaces allowing the user 12 to select information stored in the enterprise data 34 to be displayed. Illustrative interfaces include an interface 50A to enable the user 12 to select a governance document or working model of the enterprise governance to be displayed and an interface 50B to enable the user 12 to select a portion of the enterprise governance model to be displayed. Similarly, the computer system 20 can generate any of various interfaces allowing the user 12 to select a type of information to be created and/or edited. Illustrative interfaces include an interface 50C to enable the user 12 to select a working model (e.g., a scenario), organization, document, message, cross-reference, and/or the like, to be created or edited, and an interface 50D to enable the user 12 to select a working model of a work flow of the enterprise to be edited/created using a workflow diagram or work project organization card interface. In an embodiment, the computer system 20 generates a single interface for presentation to the user 12, which concurrently includes two or more of the interfaces 50A-50D.

Once the information of interest has been selected, e.g., by the user 12 making a selection using one of the interfaces 50A-50D, the computer system 20 can generate a corresponding interface, such as one of the interfaces 52A-52I, including a structured view of the selected enterprise data 34. For example, the computer system 20 can generate any of the interfaces 52A-52E to present requested enterprise governance data 34A to the user 12. When the user 12 has authority to create and/or edit use cases and/or scenarios (e.g., work projects), the computer system 20 can generate any of the interfaces 52F-52I to enable the user 12 to define, edit, view, and/or the like, a selected work project. Referring to FIG. 3A, changes made by the user 12 in an interface presented by component(s) of the application framework layer 42C can be processed by component(s) in the data collection layer 42A and/or data processing layer 42B and stored, e.g., using a data-tagging schema 34B described herein.

Referring to FIGS. 3A and 4C, an illustrative process for defining a working model (e.g., scenario), which can be implemented by a set of components in the application framework layer 42C, is described. In action 302, an authorized user 12 can create a new working model and/or select an existing working model using any solution. For example, the user 12 can select to create a new and/or edit an existing working model using an interface 50C, 50D shown in FIG. 3B. In response, the application framework layer 42C can generate the work project builder API 52F (FIG. 6F), include data corresponding to the working model, if any, in the interface 52F, and provide the interface 52F for display to the user 12.

In action 304, the user 12 can navigate to a desired event of the working model (e.g., a first event of a new model at time=0) using any solution, and in action 306, the user 12 can populate/modify the data based on the type of the event using the interface 52F. In action 308, the user 12 can determine whether the next event is from another governance document 36. If so, in process 310, the user can select the data in the enterprise governance library 34A corresponding to the next governance document 36 for use in defining the next event. Regardless, in action 312, the user can continue to add/modify time-sequenced events for the working model using the data corresponding to a current governance document 36. In action 314, the user 12 can determine whether another event is to be added to the working model, and if not, the user 12 can save the working model as enterprise data 34 and exit. Subsequently, a user 12 can view data corresponding the working model, e.g., using the interfaces 52F-52I, make changes to the working model (if authorized), and/or the like.

In an illustrative embodiment, the data collection layer 42A can be configured to automatically or semi-automatically parse data (e.g., a document, block of text, and/or the like) and extract relevant information (e.g., enterprise governance data) which is stored in the enterprise governance library 34A by the data processing layer 42B. For example, the data collection layer 42A can initially obtain and store information for each organization of an enterprise. To this extent, the data collection layer 42A can identify names, nicknames, acronyms, and/or the like, associated with each organization. Furthermore, the data collection layer 42A can obtain additional information, such as a "swimlane" for the organization, which corresponds to a broader class of organizations to which the organization belongs, e.g., management, executive, production, support, research and development, and/or the like. Information that the data collection layer 42A is unable to automatically obtain can be presented for manual input by a user 12 using any solution. For each organization, the data collection layer 42A can automatically or semi-automatically parse data to identify a set of agents associated with each organization. This data can include job titles and their abbreviations, individuals, and/or the like, as well as non-human agents, such as tools utilized to support actions performed by the organization. In an embodiment, the data collection layer 42A can obtain information regarding the organization(s) and agent(s) from an authoritative data store (e.g., a document, database, and/or the like) of the enterprise and generate authoritative structured data, which is stored as enterprise data 34 for use by the data processing layer 42B in subsequent processing of input data 36A, 36B.

The computer system, data-tagging schema, and interfaces described herein can be utilized to provide solutions to various technical problems insufficiently addressed. An embodiment provides a solution for analyzing data from core business governance documents (e.g., the input data 36A, 36B) aggregated in an online repository (e.g., stored as enterprise data 34) having network users. Such a solution can provide the network users 12 access to graphical and semantic model views of the enterprise architecture (e.g., presented in the interfaces 52A-52I) generated from the business governance library 34A and available as an authorized reference for creating additional enterprise architecture model views. The solution can include a computer system (e.g., the computer system 20) obtaining electronic text and rich pictures identified by network users as authorized documents that convey enterprise business strategies and governance. The computer system can process the electronic documents to include document version identification and page or section identification URL tags. The computer system can create well-formed and valid RDF/XML documents (e.g., stored as enterprise data 34 using a data-tagging schema described herein) by analyzing the processed documents according to the specified data-tagging schema and archive each unique RDF/XML document in the enterprise knowledge base repository. In a further embodiment, the knowledge base triple-store, when populated with the total number of strategic guidance, enterprise governance, and authoritative guidance documents describing organizational authorities and responsibilities, comprises a semantic model of the minimum critical specifications of the business enterprise that enterprise planners and owners regard as what the enterprise "should-be".

In a still further embodiment, the computer system (e.g., the computer system 20) can provide interested and authorized users 12 access to the repository (e.g., the enterprise data 34) as an enterprise governance document data mine using manual or automated RDF/XML search and query techniques. Furthermore, the computer system can enable such users to access the repository using structured queries embodied by a model visualizer. In this case, the users can access the repository by, for example, selecting one or more documents from a list the entire of contents of the repository, or a list from a subset of the list; selecting from the list of all organizations modeled in the document(s) selected previously; and selecting for view any graphics and linked text describing the organization selected.

In an embodiment, the computer system can provide information regarding the selected organization(s) for presentation to a user. For example, the computer system can invoke the data-tagging schema, which can be a result of appending unique (rqt) namespace properties to existing social network and document standards for the semantic web, including, for example, W3C standards for Friend-of-a-Friend (foaf) namespace social network classes and properties, W3C standards for Dublin Core (dc) namespace document properties, and/or the like. Furthermore, the data-tagging schema (rqt) can provide a mechanism to use the semantic web standards to identify and display enterprise architecture modeling properties. For example, the computer system can: add schema properties to identify with a tag that states and/or implies the stated responsibilities, authority, and information required by specified governance documents as required products; add schema properties to represent with a tag that states and/or implies messages conveyed, describing the flow of information regarding production of these outcomes to, from, and between organizations; link the tagged products and the message tags stating and/or implying information about the products or events in the production of the products back to the URL of the source document that specified the requirement; and dereference the URL to view the source of the property modeled along with the model symbol.

In another embodiment, the computer system can provide interested and authorized users access to the knowledge base triple-store using enterprise architecture graphic modeling features embodied by a multi-system scenario-builder. For example, the computer system can: provide an interactive form that allows the user to copy and/or edit various communication streams rendered using the model visualizer, such that the scenario resembles workflow between organizations in various enterprise-identified swimlanes; provide a mechanism enabling the user to edit the document and messaging property text to include specific details regarding the scenario context; and provide a mechanism enabling the user to order the streams for future display using a unique index property, and save the set of streams as a uniquely named working model. To this extent, the computer system can provide interested and authorized users access to the working model. For example, the computer system can: update archived RDF/XML repository documents to include additional entries from the scenario-builder; provide a user access to the working model by selecting it from a list of all working models available in the repository; and generate and provide model visualizer views of the working model that show the specific edited input made by the application user and linking back to the source document specified in the original model used as the source of the edit for presentation to the user. In an embodiment, only elements of the architecture models constructed using the copy-and-edit function of the scenario-builder retain linkages to their source in the enterprise digital library, thus segregating the governance elements from details added to the scenario which are based on other criteria.

While shown and described herein as a method and system for modeling an enterprise architecture, it is understood that aspects of the invention further provide various alternative embodiments. For example, in one embodiment, the invention provides a computer program fixed in at least one computer-readable medium, which when executed, enables a computer system to model an enterprise architecture. To this extent, the computer-readable medium includes program code, such as the visualization program 30 (FIG. 2), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the visualization program 30 (FIG. 2), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for modeling an enterprise architecture. In this case, the generating can include configuring a computer system, such as the computer system 20 (FIG. 2), to implement the method of modeling an enterprise architecture. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computerized method of evaluating an enterprise, the method comprising:
   constructing an enterprise governance library from a set of enterprise governance documents using a computer system, wherein each enterprise governance document in the set of enterprise governance documents includes natural language text defining at least a portion of the enterprise, and wherein the constructing includes, for each enterprise governance document in the set of enterprise governance documents:
      parsing the natural language text to identify a set of references relating to the enterprise, wherein each reference in the set of references identifies a key object relating to the enterprise, wherein the key object is one of: an organization of the enterprise, an agent of the enterprise, a product of the enterprise, or a product used by the enterprise; and
      generating and storing structured data on the computer system for the enterprise governance document and for each key object in a set of key objects based on the set of references identified in the natural language text, wherein the structured data for the enterprise governance document includes data regarding communications of at least one of: an organization or an agent, referenced in the enterprise governance document, wherein the structured data for each key object includes: a plurality of attributes of the key object; data associating the key object with the enterprise governance document; and linking data for enabling access to data corresponding to the reference, and wherein the generating and storing includes refining the structured data for at least one key object using the data regarding communications of the at least one of: the organization or the agent; and
   the computer system generating a graphical user interface using the enterprise governance library and providing the interface for presentation to a user, wherein the interface includes a plurality of swimlanes, each swimlane visually associated with a unique peer group of a plurality of peer groups of the enterprise, wherein the generating includes populating each of the plurality of swimlanes using the structured data corresponding to at least one of: an organization or an agent, belonging to the corresponding peer group and the structured data corresponding to communications of the at least one of: the organization or the agent.

2. The method of claim 1, wherein the constructing further includes, for each enterprise governance document in the set of enterprise governance documents, creating and storing a tagged copy of the enterprise governance document, wherein the tagged copy of the enterprise governance document includes a set of tags for use in accessing the data corresponding to at least one reference in the enterprise governance document, and wherein the data for enabling access to data corresponding to the reference includes data corresponding to at least one of the set of tags in the tagged copy of the enterprise governance document.

3. The method of claim 1, further comprising the computer system generating a second interface using the enterprise governance library and providing the second interface for presentation to a user, wherein the second interface includes display data corresponding to at least one key object in the set of key objects and a mechanism for accessing the data corresponding to the reference to the key object in the enterprise governance document providing the basis for the display data.

4. The method of claim 1, wherein a key object in the set of key objects is one of: the organization or the agent, and wherein the structured data for each key object further includes data associating the key object to one of a plurality of peer groups associated with the enterprise.

5. The method of claim 4, further comprising the computer system generating a second interface using the enterprise governance library and providing the second interface for presentation to a user, wherein the second interface includes display data corresponding to a plurality of key objects, and wherein the display data corresponding to each of the plurality of key objects includes a visual indication identifying the one of the plurality of peer groups corresponding to the key object.

6. The method of claim 1, wherein the parsing further identifies an association between a first key object identified in a first reference and a second key object based on a context of the first reference, wherein the second key object is one of: a key object identified in a second reference or the enterprise governance document, and wherein the structured data for at least one of: the first key object or second key object, further includes data corresponding to the association.

7. The method of claim 6, wherein the first and second key objects are both one of: an organization or an agent, and wherein the data corresponding to the association identifies a level of communication between the first and second key objects indicated by the association.

8. The method of claim 1, wherein a first key object in the set of key objects is another enterprise document, and wherein the structured data for at least one of: the enterprise governance document or the first key object further includes cross reference data identifying the reference.

9. The method of claim 1, wherein the interface displays a communication chart for an organization of the enterprise, wherein the organization includes a plurality of teams, and wherein each of the plurality of peer groups corresponds to one of the plurality of teams, each swimlane including:
   display data corresponding to at least one of: communications with another entity of the enterprise or knowledge of another entity of the enterprise; and a mechanism for enabling access to data corresponding to at least one reference in the enterprise governance document corresponding to the display data.

10. The method of claim 1, wherein the interface displays a work project of the enterprise, wherein the interface displays a time ordered sequence including:
communications between at least some of the plurality of peer groups and document production by at least one of the plurality of peer groups; and
a mechanism for enabling access to data corresponding to at least one reference in the enterprise governance document corresponding to the communications.

11. The method of claim 10, wherein the interface enables a user to edit the work project, and wherein the work project corresponds to a modification to the enterprise being evaluated by the user.

12. The method of claim 1, further comprising the computer system generating a second interface using the enterprise governance library and providing the second interface for presentation to the user, wherein the second interface includes document reference display data corresponding to an enterprise governance document in the set of enterprise governance documents, the document reference display data including key object display data corresponding to at least some of the set of key objects identified in the enterprise governance document, reference document display data corresponding to at least one other enterprise governance document in the set of enterprise governance documents that references the enterprise governance document, and linked document display data corresponding to at least one other enterprise governance document in the set of enterprise governance documents directly linked to the enterprise document.

13. The method of claim 12, wherein the second interface further includes a mechanism for causing the computer system to generate a third interface for a selected enterprise governance document associated with display data included in the second interface using the enterprise governance library and providing the third interface for presentation to the user, wherein the third interface includes a mechanism for accessing an original document for the selected enterprise governance document.

14. The method of claim 13, wherein the third interface further includes: key object display data corresponding to at least some of the set of key objects identified in the selected enterprise governance document; and a mechanism for enabling display data corresponding to at least one other enterprise governance document in the set of enterprise governance documents that also includes a selected key object of the at least some of the set of key objects.

15. The method of claim 1, wherein the structured data for the set of enterprise governance documents includes a plurality of subject-predicate-object triples data and data for accessing a source of each of the plurality of subject-predicate-object triples data in one of the set of enterprise governance documents, wherein the structured data includes a plurality of classes, the plurality of classes including: a description class for identifying a source of data, an organization class for identifying an organization of the enterprise, an agent class for identifying a position within an organization or the enterprise, and a document class for identifying a document and a type of the document, and wherein the type of document is one of: an electronic document, a message, or a cross-reference.

16. A computer system for evaluating an enterprise, the computer system including:

means for constructing an enterprise governance library from a set of enterprise governance documents, wherein each enterprise governance document in the set of enterprise governance documents includes natural language text defining at least a portion of the enterprise, and wherein the means for constructing includes, for each enterprise governance document in the set of enterprise governance documents:
parsing the natural language text to identify a set of references relating to the enterprise, wherein each reference in the set of references identifies a key object relating to the enterprise, wherein the key object is one of: an organization of the enterprise, an agent of the enterprise, a product of the enterprise, or a product used by the enterprise; and
generating and storing structured data for the enterprise governance document and for each key object in a set of key objects based on the set of references identified in the natural language text, wherein the structured data for the enterprise governance document includes data regarding communications of at least one of: an organization or an agent, referenced in the enterprise governance document, wherein the structured data for each key object includes: a plurality of attributes of the key object; data associating the key object with the enterprise governance document; and linking data for enabling access to data corresponding to the reference;
means for generating an interface using the enterprise governance library, wherein the interface includes display data corresponding to at least one key object in the set of key objects and a mechanism for accessing the data corresponding to the reference to the key object in the enterprise governance document providing the basis for the display data using the linking data for the at least one key object, wherein the interface includes a plurality of swimlanes, each swimlane visually associated with a unique peer group of a plurality of peer groups of the enterprise, wherein the means for generating includes populating each of the plurality of swimlanes using the structured data corresponding to at least one of: an organization or an agent, belonging to the corresponding peer group and the structured data corresponding to communications of the at least one of: the organization or the agent; and
means for providing the interface for presentation to a user.

17. The system of claim 16, wherein the means for constructing further includes, for each enterprise governance document in the set of enterprise governance documents, creating and storing a tagged copy of the enterprise governance document, wherein the tagged copy of the enterprise governance document includes a set of tags for use in accessing the data corresponding to at least one reference in the enterprise governance document, and wherein the data for enabling access to data corresponding to the reference includes data corresponding to at least one of the set of tags in the tagged copy of the enterprise governance document.

18. The system of claim 16, wherein the interface displays a communication chart for an organization of the enterprise, wherein the organization includes a plurality of teams, and wherein each of the plurality of peer groups corresponds to one of the plurality of teams, each swimlane including:
display data corresponding to at least one of: communications with another entity of the enterprise or knowledge of another entity of the enterprise; and a mechanism for enabling access to data corresponding to at least one reference in the enterprise governance document corresponding to the display data.

19. A computer system including:

a set of processors;

a storage component coupled to the set of processors; and a visualization program stored in the storage component, wherein the visualization program comprises program code, which when executed, enables the computer system to implement a method of evaluating an enterprise, the method comprising:

constructing an enterprise governance library from a set of enterprise governance documents, wherein each enterprise governance document in the set of enterprise governance documents includes natural language text defining at least a portion of the enterprise, and wherein the constructing includes, for each enterprise governance document in the set of enterprise governance documents:

parsing the natural language text to identify a set of references relating to the enterprise, wherein each reference in the set of references identifies a key object relating to the enterprise, wherein the key object is one of: an organization of the enterprise, an agent of the enterprise, a product of the enterprise, or a product used by the enterprise; and generating and storing structured data for the enterprise governance document and for each key object in a set of key objects based on the set of references identified in the natural language text in the storage component, wherein the structured data for the enterprise governance document includes data regarding communications of at least one of: an organization or an agent, referenced in the enterprise governance document, wherein the structured data for each key object includes: a plurality of attributes of the key object; data associating the key object with the enterprise governance document; and linking data for enabling access to data corresponding to the reference;

generating an interface using the enterprise governance library, wherein the interface includes display data corresponding to at least one key object in the set of key objects and a mechanism for accessing the data corresponding to the reference to the key object in the enterprise governance document providing the basis for the display data using the linking data for the at least one key object, wherein the interface includes a plurality of swimlanes, each swimlane visually associated with a unique peer group of a plurality of peer groups of the enterprise, wherein the means for generating includes populating each of the plurality of swimlanes using the structured data corresponding to at least one of: an organization or an agent, belonging to the corresponding peer group and the structured data corresponding to communications of the at least one of: the organization or the agent; and providing the interface for presentation to a user.

20. The computer system of claim 19, wherein the constructing further includes, for each enterprise governance document in the set of enterprise governance documents, creating and storing a tagged copy of the enterprise governance document in the storage component, wherein the tagged copy of the enterprise governance document includes a set of tags for use in accessing the data corresponding to at least one reference in the enterprise governance document, and wherein the data for enabling access to data corresponding to the reference includes data corresponding to at least one of the set of tags in the tagged copy of the enterprise governance document.

\* \* \* \* \*